(12) United States Patent
Zmijewski et al.

(10) Patent No.: US 11,119,748 B2
(45) Date of Patent: Sep. 14, 2021

(54) METHOD AND APPARATUS FOR OPERATING A MOBILE APPLICATION STORE

(71) Applicant: IRON GAMING LIMITED, Swatar (MT)

(72) Inventors: Peter Marek Zmijewski, Singapore (SG); Scott Matthew Dowdell, Singapore (SG)

(73) Assignee: IRON GAMING LIMITED, Swatar (MT)

( * ) Notice: Subject to any disclaimer, the term of this patent is extended or adjusted under 35 U.S.C. 154(b) by 0 days.

(21) Appl. No.: 16/631,896

(22) PCT Filed: May 3, 2019

(86) PCT No.: PCT/SG2019/050252
§ 371 (c)(1),
(2) Date: Jan. 17, 2020

(87) PCT Pub. No.: WO2020/226566
PCT Pub. Date: Nov. 12, 2020

(65) Prior Publication Data
US 2021/0232380 A1 Jul. 29, 2021

(51) Int. Cl.
*G06F 8/61* (2018.01)
*G06Q 30/06* (2012.01)
*H04W 4/60* (2018.01)

(52) U.S. Cl.
CPC .......... *G06F 8/61* (2013.01); *G06Q 30/0641* (2013.01); *H04W 4/60* (2018.02)

(58) Field of Classification Search
CPC .... G06F 8/61; G06F 8/65; G06F 8/70; H04W 4/60; G06Q 30/0641
See application file for complete search history.

(56) References Cited

U.S. PATENT DOCUMENTS 7,925,250 B2 * 4/2011 Redpath ............. G06F 9/45537
455/420
10,552,137 B2 * 2/2020 Zmijewski ............... G06F 3/01
(Continued)

FOREIGN PATENT DOCUMENTS

WO 2019/032045 A1 2/2019

OTHER PUBLICATIONS

PCT, Intellectual Property Office of Singapore (ISA/SG), International Search Report and Written Opinion of the International Searching Authority, International Application No. PCT/SG2019/050252, 10 pages, dated Jul. 23, 2019.

*Primary Examiner* — Marina Lee
(74) *Attorney, Agent, or Firm* — Thompson Hine LLP

(57) ABSTRACT

A method and apparatus for operating a mobile application store. In an exemplary embodiment, the method includes executing a first mobile application store that operates in an environment of an operating system of the apparatus; receiving user input to select a mobile application in the store to run; connecting to a second mobile application store operable only in an environment of an operating system of a mobile device; obtaining user account information for authenticating a connection to the second mobile application store; requesting the mobile application to be downloaded to the apparatus from the second mobile application store; downloading and installing the mobile application; and instructing an emulator installed on the apparatus to run the mobile application. The application selected to run is configured to run only in the environment of the operating system of the mobile device.

19 Claims, 14 Drawing Sheets

(56) References Cited

U.S. PATENT DOCUMENTS

| | | | |
|---|---|---|---|
| 2009/0182546 A1* | 7/2009 | Gentric | G06F 9/45537 |
| | | | 703/27 |
| 2012/0245918 A1* | 9/2012 | Overton | G06F 8/38 |
| | | | 703/27 |
| 2013/0047149 A1* | 2/2013 | Xu | H04L 67/02 |
| | | | 717/175 |
| 2013/0346268 A1 | 12/2013 | Pereira et al. | |
| 2014/0130134 A1 | 5/2014 | Arora et al. | |
| 2014/0359595 A1 | 12/2014 | Sehgal et al. | |
| 2019/0166148 A1* | 5/2019 | Eskandari | H04L 63/1433 |

* cited by examiner

METHOD AND APPARATUS FOR OPERATING A MOBILE APPLICATION STORE

FIELD

The present invention relates to a method and apparatus for operating a mobile application store. In particular, the apparatus is configured to run an operating system not capable of running a mobile application in the mobile application store directly.

BACKGROUND

In existing technology, it is possible for a mobile application store (e.g. Google Play Store or Apple Store) to be displayed, for instance, in a web browser, in an environment of an operating system of a desktop or laptop computer. However, none of the mobile applications in the displayed mobile application store can operate in the environment of the operating system of the desktop or laptop computer. An emulator to emulate a mobile environment to run the mobile applications may be installed in the desktop or laptop operating system to enable mobile applications to run. However, even after an emulator is installed, it is quite difficult technically for a typical user to know what else is required to run a mobile application in the environment of the operating system of the desktop or laptop computer. The user needs to have sufficient technical knowledge in order to know what to do.

SUMMARY

According to an example of the present disclosure, there are provided a method and apparatus as claimed in the independent claims. Some optional features are defined in the dependent claims.

DETAILED DESCRIPTION

Figure 1:
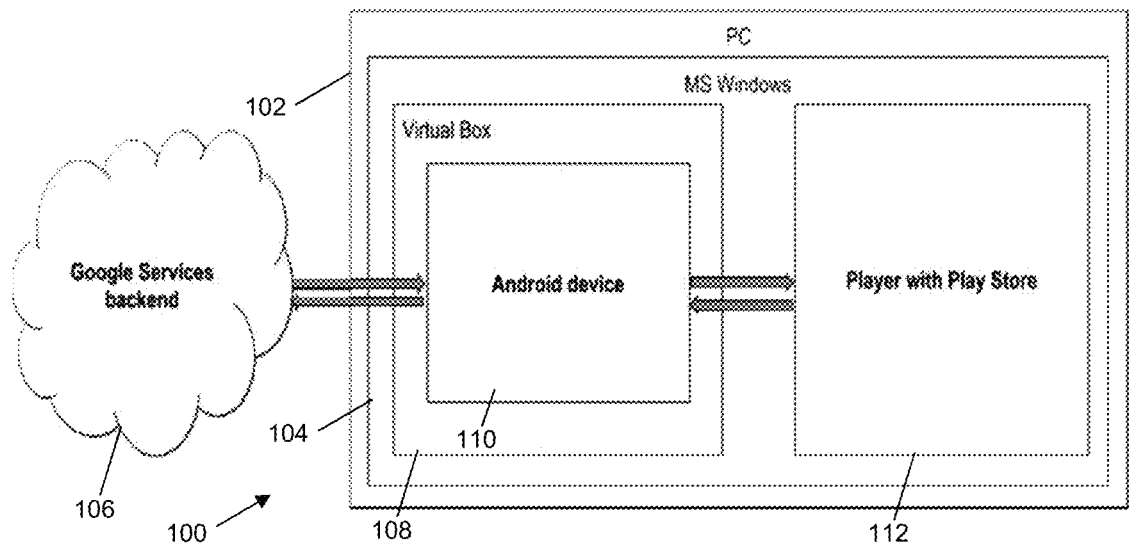
FIG. 1 shows a system architecture according to an example of the present disclosure.

An example of the present disclosure includes a method and an apparatus for operating a mobile application store that is executable and displayable in an environment of an operating system not capable of running the mobile application directly. The mobile application in this case refers to a mobile application or app that is configured to run in the operating system of a mobile device, such as a smartphone, a tablet device, and the like. For example, the operating system of the mobile device may be the iPhone Operating System, Android operating system, and the like. The mobile application store is configured such that each mobile application selected from the mobile application store is executable or can be run in the environment of the operating system of an apparatus that is not capable of running the mobile application directly. For example, the operating system not capable of running the mobile application directly may be the operating system of a personal computer, which includes desktop or laptop computer, and/or any device not running the operating system of a mobile device. For instance, if a smart television or video game console is not operating under an operating system of a mobile device (e.g. not Android or Apple Operating System enabled), such operating system of the smart television or video game console would be regarded as running an operating system that is not capable of running the mobile application directly in the present disclosure.

An example of the apparatus (or user machine) that is not capable of running the mobile application directly and is configured in accordance with features of examples of the present disclosure to be able to run the mobile application store and eventually run the mobile application is described as follows. Such apparatus may be a client device and can communicate with one or more server via the Internet. The apparatus of the present example may have the following components in electronic communication via a bus:

1. a display;
2. non-volatile memory;
3. random access memory ("RAM");
4. N processing components ("one or more processors");
5. a transceiver component that includes N transceivers;
6. user controls i.e. user input devices;
7. optionally, image capturing components;
8. optionally, audio signal capturing components;
9. audio speakers; and 10. Input/Output interfaces for connecting to the user input devices (such as mouse, joystick, keyboard, sensors for detecting user gestures, and the like), the audio speakers, display, image capturing components and/or audio signal capturing components.

The display generally operates to provide a presentation of graphical content (e.g. graphical contents of the mobile device software, the one or more links, announcements and/or advertisements herein described) to a user, and may be realized by any of a variety of displays (e.g., CRT, LCD, HDMI, micro-projector and OLED displays). And in general, the non-volatile memory functions to store (e.g., persistently store) data and executable code, instructions, program or software including code, instructions, program or software that is associated with the functional components of a browser component and applications, and in one example, a platform, or also known herein as emulator (e.g. 108 in FIG. 1), for running mobile application. In some embodiments, for example, the non-volatile memory includes bootloader code, modem software, operating system code, file system code, and code to facilitate the implementation of one or more portions of the platform as well as other components well known to those of ordinary skill in the art that are not depicted for simplicity.

In many implementations, the non-volatile memory is realized by flash memory (e.g., NAND or NOR memory), but it is certainly contemplated that other memory types may be utilized as well. Although it may be possible to execute the code from the non-volatile memory, the executable code in the non-volatile memory is typically loaded into RAM and executed by one or more of the N processing components.

The N processing components (or "one or more processors") in connection with RAM generally operate to execute the instructions stored in non-volatile memory to effectuate the functional components. As one skilled in the art (including ordinarily skilled) will appreciate, the N processing components may include a video processor, modem processor, DSP, graphics processing unit (GPU), and other processing components. In some implementations, the processing components are configured to determine a type of software activated on the apparatus.

The transceiver component may include N transceiver chains, which may be used for communicating with external devices via wireless networks. Each of the N transceiver chains may represent a transceiver associated with a particular communication scheme. For example, each transceiver may correspond to protocols that are specific to local area networks, cellular networks (e.g., a CDMA network, a GPRS network, a UMTS networks), and other types of communication networks. In some implementations, the communication of the transceiver component with communication networks enables a location of the apparatus to be determined.

The image capturing components and the audio signal capturing components that are optionally available can also be utilised to input user controls, as defined control settings.

The processing of the executable code, instructions, program or software may be performed in parallel and/or sequentially. The executable code, instructions, program or software may be stored on any machine or computer readable medium that may be non-transitory in nature. The computer readable medium may include storage devices such as magnetic or optical disks, memory chips, or other storage devices suitable for interfacing with a computer or mobile device. The machine or computer readable medium may also include a hard-wired medium, or wireless medium. The executable code, instructions, program or software when loaded and executed effectively results in the apparatus that implements steps of methods in examples herein described.

FIG. 1 shows an example of a system 100 proposed for the example described above. Specifically, in the present example, the system 100 enables a mobile application store to be displayed in the environment of the operating system of a personal computer. In other examples, instead of the personal computer, it could be the operating system of any device not running the operating system of a mobile device. Android operating system and Android mobile applications are also featured in the present example. In other examples, instead of the Android operating system, it could be another operating system of a mobile device (e.g. iPhone Operating System).

The system 100 of FIG. 1 has the following elements.
1. A personal computer (PC) 102 with network access, central processing unit, one or more processors for executing instructions/applications stored in a memory to operate the personal computer, user input interfaces, and a display (not shown in FIG. 1), such as a computer monitor/screen. The PC 102 is a desktop or laptop computer or a similar device or apparatus. The memory can be Random Access Memory, Read Only Memory, Flash memory and the like. A hard disk drive, solid state drive, USB drive, and the like can be used to contain the memory.
2. Operating System (OS) of the PC 104 is Microsoft Windows in the present example. It is appreciated that in other examples, the OS can be Mac OS and the like,
3. Google Service Backend 106 refers to servers (external or remote to the PC) providing Google's services that can interact with the Android Operating System (AOS) and applications in the AOS.
4. An emulator 108, which is an emulator application that can run in the OS of the PC 104, is created to emulate the AOS in the OS environment of the PC 104. In the present example, the emulator 108 is created using Virtual Box, and Virtual Box refers to Oracle VM VirtualBox, which is a free and open-source hosted hypervisor for x86 computers developed by Oracle Corporation and developed initially by Innotek GmbH. The emulator 108 may be installed on the OS of the PC 104 by downloading from a website or through files provided in a computer readable medium such as a flash memory drive, disc/disk, and the like. If not already downloaded and installed, the emulator 108 may be downloaded and installed when a mobile application is selected to run via the system 100. In the present disclosure, the emulator 108 is deemed to be a platform that enables a mobile application to run in the environment of the OS of the PC 104. The terms platform and emulator are interchangeably used in the present disclosure. An example of the emulator 108 may be the platform described in International Patent Application No. PCT/SG2018/050243.
5. Android device 110 refers to an Android virtual image, device or machine that is virtualised or emulated using the emulator 108.
6. A Player with Play Store 112 (in short "Player 112") is a client program or application configured to run in the OS of the PC 104. This Player 112 can be part of the emulator 108 or be a separate application downloaded and installed to work with the emulator 108. Being part of the emulator 108 may mean that the Player 112 is programmed as a feature of the emulator 108 or integral with software of the emulator 108. This Player 112 can provide a mobile application store (further illustrated below with reference to FIG. 4) in the environment of the OS of the PC 104 that allows users to download and execute mobile application in the mobile application store. The Player 112 may also initiate running of mobile applications once they are installed. In the present example, the mobile application store is linked to Google Play Store. Google Play Store refers to the Google Play Store application provided for the AOS to allow users to view available Android mobile applications and to download them to their mobile devices. The Player 112 enables users of the PC 102 to input information directed to the Google Play Store, and enables display of information from the Google Play Store on the display of the PC 102. Notably, the user operates on the player 112 and does not operate on the AOS user interface of the Android device 110. The AOS user interface is deliberately avoided to speed up running of mobile applications.

With the help of the Player 112, a user may enter a request that will lead to display of information from the Google Play Store. The Player 112 then transmits this request to the Android device 110, where the request is further processed. If the processing is successful, then the request is transmitted to the Google Service Backend 106.

After processing by the Google Service Backend 106, a response to the request is returned to the Android device 110, where additional processing is conducted. Thereafter, the information from the Google Play Store is provided from the Android device 110 to the Player 112, which then displays the information from the Google Play Store on the display of the PC 102.

In order to allow a user to download a mobile application from the Google Play Store, the user must first be a Google Account holder, and each download requires a user to be authenticated via Google Mobile Service prior to authorization to proceed with the download.

Figure 2:
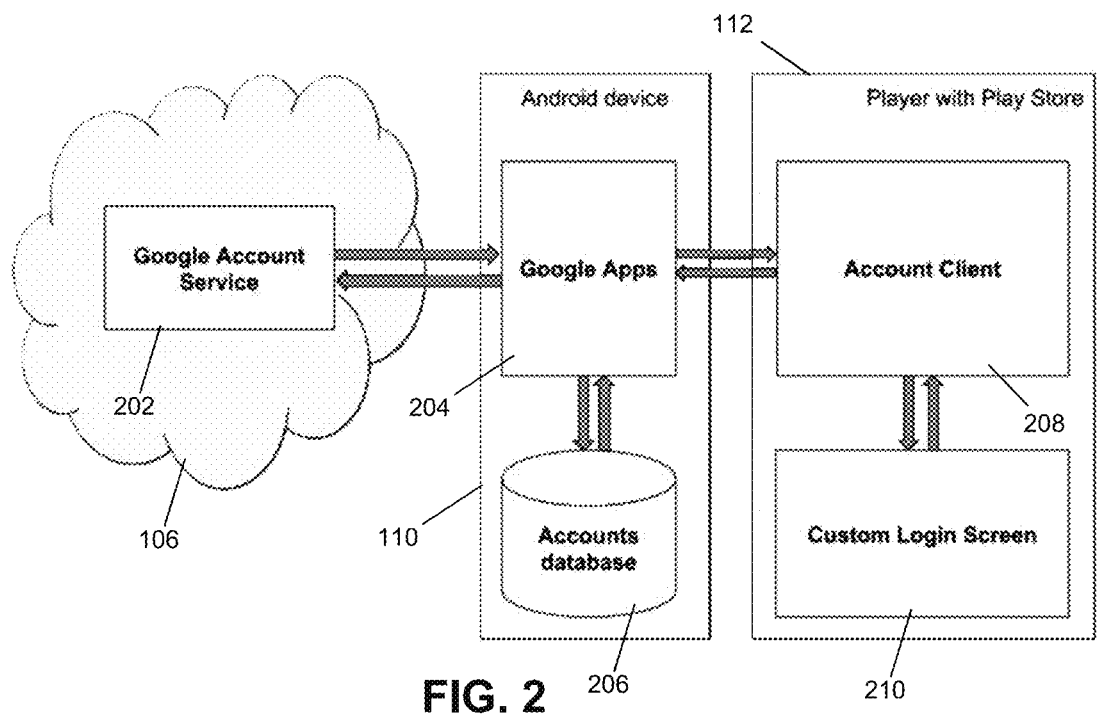
FIG. 2 illustrates use of a system with the architecture of FIG. 1 to register for a Google user account.

FIG. 2 illustrates use of the system 100 of FIG. 1 to register fora user account with Google. Such user registration is necessary for the user to connect to Google Play Store to, for instance, retrieve application details, mobile application category lists, list of mobile applications under a specific category, and initiate downloading of mobile applications from the Google Play Store to the Android device 110. Reference to the elements of FIG. 1 would be made where required in the following description.

FIG. 2 shows the following elements.
1. Google Account Service 202 is a service provided by the Google Service Backend 106. The Google Account service 202 provides users with access to Google account information and allows users to create new accounts.
2. Google Apps 204 refers to proprietary mobile applications provided by Google company, or Android mobile applications available to devices operated by the AOS. The Google Apps 204 are executable by the AOS and comprises one or more applications (app or apps) downloaded to the Android device 110.
3. Accounts database 206 is a database accessible to the Android device 110 that contains information of Google user accounts of users who had registered for a user account with Google through the Android device 110. The Accounts database 206 may be part of the memory space allocated for the Android device 110 on the PC 102. In one example, Accounts database 206 can be a system folder of the Android device 110 and be referred as "account.db".
4. Account Client 208 refers to a function of the Player 112 that receives user data/input and send user requests directed to a relevant App or Apps of the Google Apps 204 of the Android device.
5. Custom Login Screen 210 is a graphical user interface of the Player 112 enabling a user to register for a Google user account.

With the help of the Player 112, the Custom Login Screen 210 can be called out and a user can enter his/her credentials into form fields provided by the Custom Login Screen 210. After completion, the entered user data is transferred to the Account Client 208, where a request for Google user account registration is directed to the relevant App or Apps of the Google Apps 204 for processing.

The Custom Login Screen 210 can be called out by the user or automatically appear upon user activation of the Player 112, activation of the emulator 108, prior to activation of the mobile application store of the Player 112 described in the description of FIG. 1 or after user selection of a mobile application in the mobile application store of the Player 112.

In the present example, new user account registration through the Custom Login Screen 210 is described. However, the function of the Custom Login Screen 210 is also to allow a user to login to his/her Google user account. In one example, it can be configured that a user only needs to enter details to login once on the Custom Login Screen 210 and future logins would be automated with the entered details. Auto-saving of username and password may be implemented. The user account information entered is stored in the Accounts database 206 for new user account registration, or when the login to a specific user account is performed for a first time on the PC 102.

After receiving the request, the relevant App or Apps of the Google Apps 204 process and send the request to Google Account Service 202 for performing user account registration. In case of successful registration by Google Account Service 202, the relevant App or Apps of the Google Apps 204 is notified to add new user account data to the Accounts database 206 of the Android device 110 and send the registration information to the Account Client 208. The Account Client 208 then sends a request to the Custom Login Screen 210 to provide an update in a graphical format on the display of the PC 102 to inform the user about the new user account registration.

If Google Account Service 202 has not registered the new user account, for instance, in the case of an error, then Google Account Service 202 would notify the relevant App or Apps of the Google Apps 204 accordingly, which in turn notifies the Account Client 208. The Account Client 208 then sends a request to the Custom Login Screen 202 to update in a graphical format on the display of the PC 102 to inform the user that the new account registration has, for instance, an error and is unable to proceed.

Both FIGS. 3 and 4 described below show different ways of implementing a mobile application store that allow a user to request to run a mobile application in the mobile application store and to install the mobile application from Google Play Store, if it is not already installed.

Figure 3:
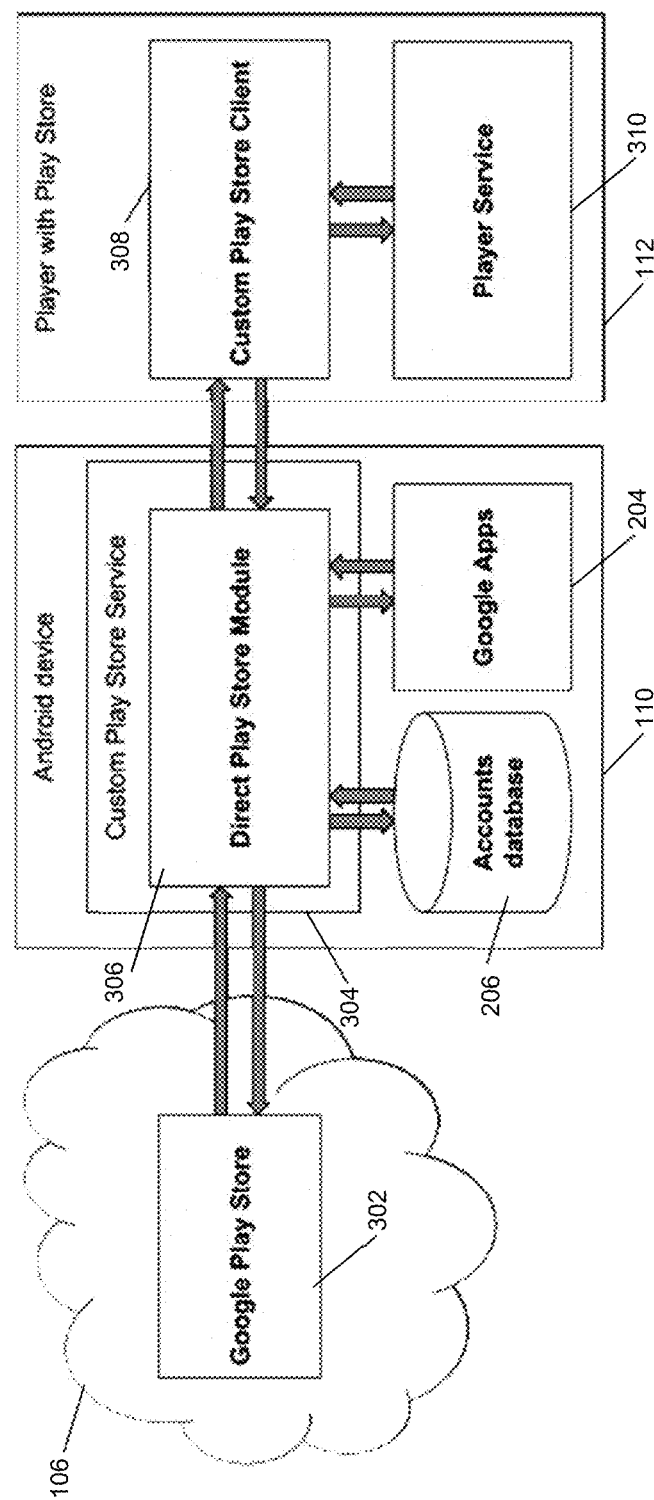
FIG. 3 illustrates an example of a system for downloading, installation and running of a mobile application selected from a mobile application store in a website.

FIG. 3 illustrates an example on how the system 100 of FIG. 1 and FIG. 2 may enable a mobile application to be installed and executed in the environment of the OS of the PC 104 in FIG. 1. Reference to the elements of FIG. 1 and FIG. 2 would be made where required in the following description.

FIG. 3 shows the following elements in addition to the Google Service Backend 106, Android device 110, Player 112, Google Apps 204 and the Accounts database 206.

1. Google Play Store 302 refers to the Google Play Store application provided for the AOS to allow users to view available Android mobile applications and to download them to their mobile devices.
2. Custom Play Store Service 304 is a proprietary service created to be implemented inside the Android device 110. The function of Custom Play Store Service 304 is programmed to work directly with the Google Play Store 302.
3. Direct Play Store Module 306 is a module in the Custom Play Store Service 304, which is implemented to handle installation of a mobile application obtained from the Google Play Store 302 onto the Android device 110.
4. Custom Play Store Client 308 is a function of the Player 112 that sends requests from a Player Service 310 to the Custom Play Store Service 304 of the Android device 110.
5. Player Service 310 is implemented in the Player 112 and configured to control behaviour of the Player 112 and process input to the Player 112 from a Communicator (Not shown in FIG. 3). The Communicator in the present example is an application created to run in the OS of the PC 104 and the Communicator is able to communicate with the Player 112. The communicator is an application that is able to instruct the Player 112 to proceed with mobile application installation. Upon instruction by the Communicator, the Player 112 activates the Player Service 310 to do the necessary to connect to the Google Play Store 302 for the downloading. In one example, the communicator may be configured to communicate with a web browser through a browser extension. In this case, mobile application installation and running may be triggered through user selection made on the browser. The communicator may be installed on the OS of the PC 104 at the same time as the emulator 108 or as part of the emulator 108.

The flow of a user request for a specific mobile application to run and be downloaded from the Google Play Store 302 to the Android device 110 is as follows.

In the present example, a user surfs to a particular website using a browser and makes a request to run a mobile application from a website. Such website may provide a web application for initiating running of one or more mobile application in the OS of the PC 104. A catalogue of mobile applications and buttons to run each mobile application may be displayed on the website. In the present example, the website can be considered as the mobile application store. Upon making selections on the website to run a selected mobile application, the user may be prompted to download the communicator and/or the emulator 108 if they are not already downloaded and installed on the OS of the PC 104. Alternatively, such user prompting may be skipped and the process flow proceeds directly to download the communicator and/or the emulator 108 if they are not already downloaded. The checking of whether the communicator and/or the emulator 108 are installed may be made through the help of a browser extension of the browser.

After the user selects a mobile application to be run (e.g. by clicking a play button) on the browser, the browser passes the request to the communicator. The communicator then sends the request to the Player Service 310 to begin mobile application installation from the Google Play Store 302. After the request is received, the Player Service 310 sends a request for direct app installation to the Custom Play Store Client 308. The Custom Play Store Client 308 prepares and sends a request to the Custom Play Store Service 304 of the Android device 110.

While processing the request, the Custom Play Store Service 304 processes the necessary data required for direct app installation and sends further processing request to the Direct Play Store Module 306. The Accounts database 206 is accessed to retrieve the user account information required for Google user account authentication, which allows downloading of the requested mobile application after successful authentication. The relevant app or apps of the Google Apps 204 is activated to generate the necessary information required for forming a mobile application download request to Google Play Store 302. The Direct Play Store Module 306 receives the necessary information from the Accounts database 206 and the relevant app or apps of the Google Apps 204 for forming the mobile application download request to Google Play Store 302. Such mobile application download request is then sent directly through the Custom Play Store Service 304 to the Google Play Store 302.

A response will then be received from Google Services responsible for handing requests to the Google Play Store 302. Such response is passed to the Direct Play Store Module 306. In case of a positive response i.e. the download is allowed, the Direct Play Store Module 306 starts a process to download an apk file of the requested mobile application from Google Play Store 302. Once download is successful, the downloaded mobile application is installed on the Android device 110. During the downloading and installation of the mobile application, the Direct Play Store Module 306 informs the Custom Play Store Service 304 about the process of downloading and installation. This information is then sent by the Custom Play Store Service 304 to the Custom Play Store Client 308. The Custom Play Store Client 308 then performs the necessary to display the downloading/installation messages or progress notifications in a graphical user interface to update the user. It should be noted that such downloading/installation messages or progress notifications are optional and may be omitted to speed up processing.

When the installation process of the mobile application is complete, control is returned to the Custom Play Store Service 304, which informs the Custom Play Store Client 308 about the successful completion of the installation of the requested mobile application. The Custom Play Store Client 308 then notifies the Player service 310 about the successful installation, and in response to that, the Player 112 initiates the running of the installed mobile application by the emulator 108.

Configuration data specific to the mobile application for running it properly by the emulator 108 on the PC 102 may be downloaded (e.g. by the Player 112 or Communicator) in a separate step of the mobile application running process from a pre-determined remote server. The emulator 108 may be configured to include pre-determined configuration data. The configuration data may include preferred display resolution, screen orientation (landscape or portrait), and other display settings to display the graphical contents of the mobile application, and preferred keyboard keys/mouse actions, captured gesture actions or touchscreen actions to operate the mobile application. Such pre-determined configuration data may be re-configured by users according to their preference. In one example, the configuration data may be downloaded anytime after the user selects to run the mobile application on the website but before initiating the running of the installed mobile application.

The mobile application can be configured to run immediately after installation. Hence, the installation and running are advantageously regarded as a "one-step" procedure to the user. In the case that the above-mentioned user prompts for downloading are deliberately omitted or minimised in the system design, it would appear to the user that the mobile application runs immediately after selecting the mobile application from the particular website. Furthermore, the installation process from Google Play Store can be made transparent to the user. The result would be a great enhancement to user experience and would speed up the running of the mobile application.

Figure 4:
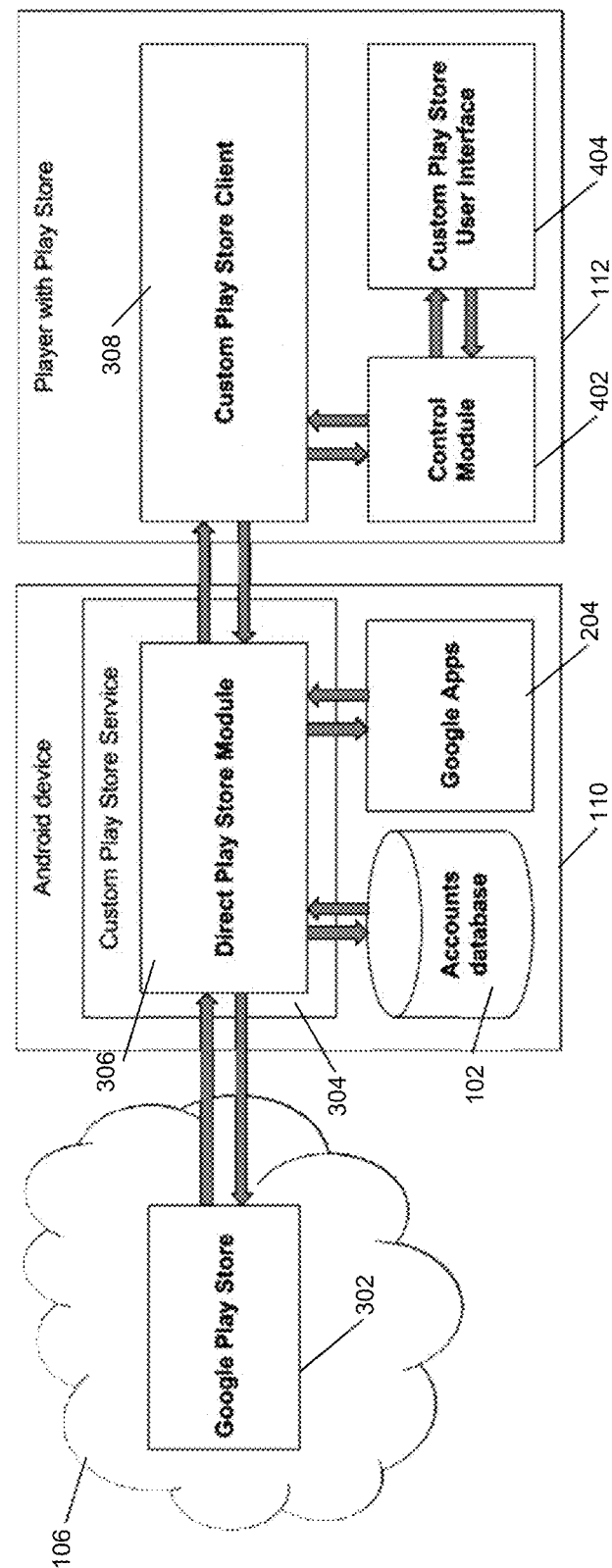
FIG. 4 illustrates an example of a system for downloading, installation and running of a mobile application selected from a mobile application store.

FIG. 4 is different from FIG. 3 only in that FIG. 3 shows the Player Service 310 and FIG. 4 shows a control module 402 and a Custom Play Store User Interface 404. Instead of a website displayed on a browser, which is considered the mobile application store in FIG. 3, FIG. 4 provides a Customised or Custom Play Store application (i.e. mobile application store) that runs in the OS of the PC 104. This Customised Play Store application can be provided as part of the emulator 108 or be downloaded and installed together with the emulator 108. Being part of the emulator 108 may mean that the Customised Play Store application is programmed as a feature of the emulator 108 or integral with software of the emulator 108. This Customised Play Store application enables users to run a mobile application in the OS of the PC 104 and install the mobile application from Google Play Store, if not already installed. Such Customised Play Store application of FIG. 4 can be provided in the same system, in addition to and co-existing with the website-based mobile application store described with reference to FIG. 3. It is also possible that the examples of FIGS. 3 and 4 are provided separately in different systems and are not co-existing in the same system.

Preferably, the Customised Play Store application is configured to be not part of a mobile device operating system (e.g. Android OS, IOS and the like) that the emulator 108 is configured to emulate to run mobile applications of the mobile device operating system. The Customised Play Store application is also configured to be accessible on the PC 102 without running the emulator 108 i.e. users do not need to launch the emulator 108 in order to use the Customised Play Store application. The emulator 108 can be launched only when a user makes a selection or request to run a particular mobile application through the Customised Play Store application. The Customised Play Store application is thus very different from a mobile OS app store (e.g. Google Play Store, Apple App Store, and the like) that is accessible through operating a mobile device OS that is emulated by an emulator.

The control module 402 is a module in the Player 112, which controls the behaviour of the Custom Play Store User Interface 404 and translates actions made in the Custom Play Store User Interface 404, into instructions to the Custom Play Store Client 308.

The Custom Play Store User Interface 404 is a graphical user interface of the Customised Play Store application programmed to run in the OS of the PC 104. The Custom Play Store User Interface 404 may resemble the graphical user interface of the Google Play Store application and have all of the features the Google Play Store has. For instance, the Custom Play Store User Interface 404 may allow a user to sort mobile applications by categories, look through a list of mobile applications in each category, look through details of each mobile application, retrieve list of recommended applications, etc. A user may also request to install a mobile application with the help of the Custom Play Store User Interface 404.

The Custom Play Store User Interface 404 may be a Microsoft Windows application with html elements that allows customised theme and color. For instance, the html elements allow programming of page design template to a class and such class can be used to enable customised Graphical User Interface design. In this manner, options for selecting themes can be provided for Custom Play Store User Interface 404.

For example, a user may select a mobile application displayed in the Custom Play Store User Interface 404 for installation on the PC 102. The user selection activates the control module 402. The control module 402 prepares a request to the Custom Play Store Client 308. The Custom Play Store Client 308 prepares and sends a request to the Custom Play Store Service 304 of the Android device 110.

While processing the request, the Custom Play Store Service 304 processes the necessary data required for direct app installation and sends further processing request to the Direct Play Store Module 306. The Accounts database 206 is accessed to retrieve the user account information required for Google user account authentication, which allows downloading of the requested mobile application after successful authentication. The relevant app or apps of the Google Apps 204 is activated to generate the necessary information required for forming a mobile application download request to Google Play Store 302. The Direct Play Store Module 306 receives the necessary information from the Accounts database 206 and the relevant app or apps of the Google Apps 204 for forming the mobile application download request to Google Play Store 302. Such mobile application download request is then sent directly through the Custom Play Store Service 304 to the Google Play Store 302.

A response will then be received from Google Services responsible for handing requests to the Google Play Store 302. Such response is passed to the Direct Play Store Module 306. In case of a positive response i.e. the download is allowed, the Direct Play Store Module 306 starts a process to download an apk file of the requested mobile application from Google Play Store 302. Once download is successful, the downloaded mobile application is installed on the Android device 110. During the downloading and installation of the mobile application, the Direct Play Store Module 306 informs the Custom Play Store Service 304 about the process of downloading and installation. This information is then sent by the Custom Play Store Service 304 to the Custom Play Store Client 308. The Custom Play Store Client 308 then performs the necessary to display the downloading/installation messages or progress notifications in the Custom Play Store User Interface 404 to update the user. When the installation process of the mobile application is complete, control is returned to the Custom Play Store Service 304, which informs the Custom Play Store Client 308 about the successful completion of the installation of the requested mobile application. The Custom Play Store Client 308 then notifies the control module 402 about the successful installation, and in response to that, the Player 112 initiates the running of the installed mobile application by the emulator 108.

Notably, the mobile application is run immediately after installation. Hence, the installation and running advantageously appear as a "one-step" procedure to the user. In the examples that user prompts for downloading are deliberately omitted or minimised in the design of the system, it would appear to the user that the mobile application runs quickly or immediately after selecting the mobile application from the Custom Play Store User Interface 404. Furthermore, the installation process from Google Play Store can be made transparent to the user, with no indication of installation. The end result is a great enhancement to user experience and speeds up the running of the mobile application.

Configuration data specific to the mobile application for running it properly by the emulator 108 on the PC 102 may be downloaded (e.g. by the Player 112 or Communicator) in a separate step of the mobile application running process from a pre-determined remote server or the emulator 108 may be configured to include pre-determined configuration data. The configuration data may include preferred display resolution, screen orientation (landscape or portrait), and other display settings to display the graphical contents of the mobile application, and preferred keyboard keys/mouse actions, captured gesture actions or touchscreen actions to operate the mobile application. Such pre-determined configuration data may be re-configured by users according to their preference. The emulator 108 would apply settings defined in the configuration data to run the mobile application. In one example, the configuration data may be downloaded anytime after the user selects the mobile application displayed in the Custom Play Store User Interface 404 but before initiating the running of the installed mobile application.

Figure 5:
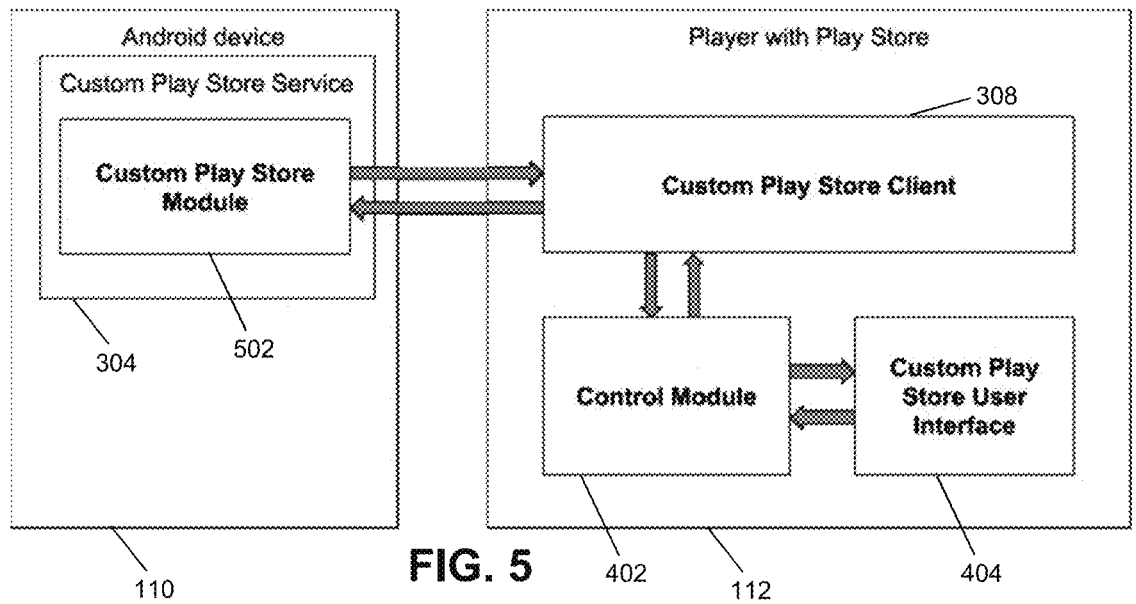
FIG. 5 illustrates a system for uninstallation of a mobile application.

FIG. 5 illustrates a system that is the same as the system of FIG. 4. The only difference between FIG. 5 and FIG. 4 is that FIG. 5 shows a Custom Play Store Module 502.

The Custom Play Store Module 502 is a module in the Custom Play Store Service 304 that is responsible for installation and uninstallation functions of a mobile application installed on the Android device 110. Although not shown in FIGS. 3 and 4, the custom play store module 502 is called upon to perform installation of any downloaded mobile application from the Google Play Store. The uninstallation function of the Custom Play Store Module 502 is described as follows.

Through the Custom Play Store User Interface 404, a user can choose to delete any mobile application installed on the Android device 110 or those installed through the Custom Play Store User Interface 404. When a user request for app deletion or removal is received at the Custom Play Store User Interface 404, such request is sent to the control module 402. The control module 402 then sends the request to the Custom Play Store Client 308, which in turn forms a request to the Custom Play Store Service 304. The Custom Play Store Service 304 processes the request for app deletion and sends the deletion request to the Custom Play Store Module 502. The Custom Play Store Module 502 then deletes the mobile application from the Android device 110 and control returns to the Custom Play Store Service 304, which notifies the successful uninstallation to the Custom Play Store Client 308. The Custom Play Store Client 308 then notifies the successful uninstallation to the control module 402, which updates the Custom Play Store User Interface 404 accordingly. Upon receiving the notification, the Custom Play Store User Interface 404 performs the necessary to display the successful uninstallation result to the user.

FIGS. 6 to 9 and FIGS. 10 to 12 illustrates features, which the mobile application store of FIG. 3 or FIG. 4 may have.

Figure 6:
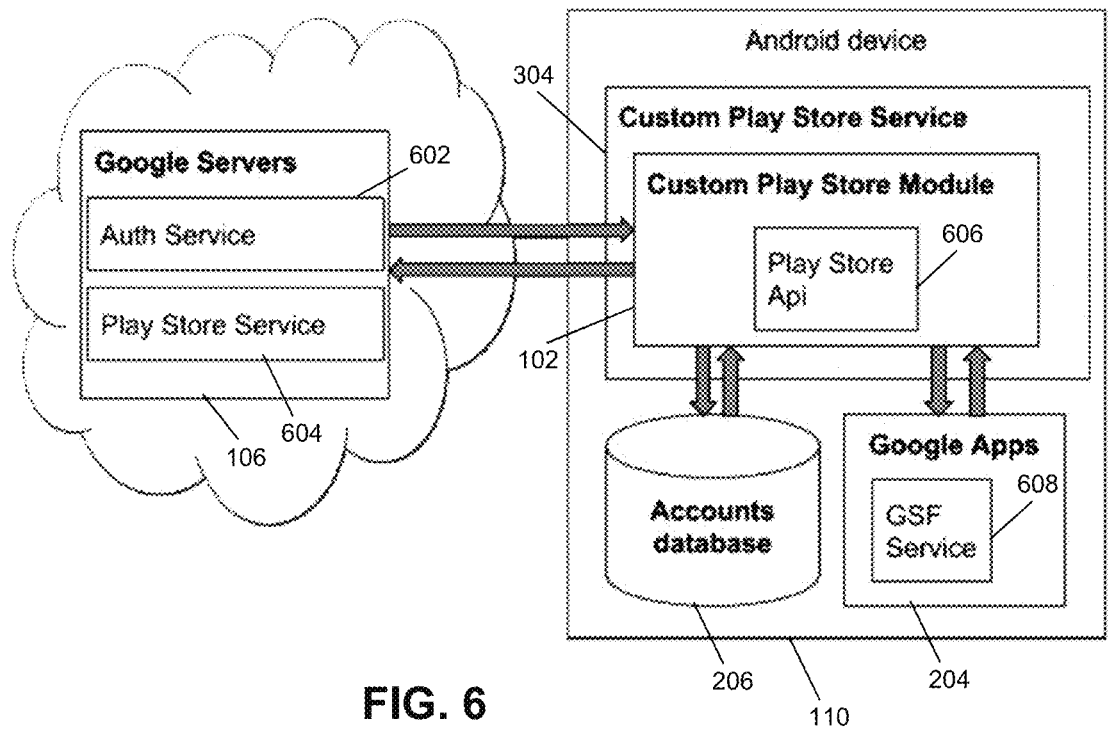
FIG. 6 illustrates elements for interaction between a Custom Play Store Service of an example of the present disclosure and Google Servers.

FIG. 6 shows a system similar to that of FIGS. 3 to 5, and specifically illustrates specific interaction of the Custom Play Store Service 304 with Google Services backend 106. The Direct Play Store Module 306 may have the same features as those illustrated for the Custom Play Store Module 502 in FIG. 6.

The Google Services backend 106 comprises Google's Servers providing Google Services. The Google Services backend 106 provides an Authentication Service 602 (Auth Service), which is a Google service providing authentication for access to Google account information and/or Google Play Store information. The Google Services backend 106 also provides a Play Store Service 604, which basically refers to the Android mobile application store from which Android mobile apps can be downloaded.

A Play Store Application Programming Interface (API) 606 is a third-party library (For example, https://github.com/yeriomin/play-store-api) created to enable the Custom Play Store Module 502 or the Direct Play Store Module 306 of the Custom Play Store Service 304 to interact with the Auth Service 602 and Play Store Service 604.

Google Apps 204 include a Google Service Framework (GSF) comprising Google Play Services, which is an app found on every android device be it a Smartphone or a tablet or even an emulator. It is designed to silently run in the background and support largely in the working of the Android device 110. It makes sure that all of the apps in the Android device 110 are up-to-date by constantly checking upon the latest versions available. Google Play Services play a role in app updates, user authentication, location services, privacy settings etc. It also helps in speeding up searches, enhancing gaming experience and also improving maps. Furthermore, Google Play Services is a package of APIs which is very closely linked to the android system. Most of the Google apps are updated through Google Play Services. Google Play Services helps the Android device 110 to update and run almost all the latest versions of applications without having to upgrade to the latest version of Android. This means that one can use any version of the Android OS irrespective of the updates of the OS, and still be able to enjoy all the new and latest apps and features that are launched with the help of Google Play Services. One use of the Google Play Services in examples of the present disclosure includes connecting to a user's google account to Google Play Store.

Requests from the Custom Play Store Service 304 through the Custom Play Store Module 502 or the Direct Play Store Module 306 to the Google servers may be formed through use of the third-party library Play Store API 606. For example, the following methods may be implemented. Note that these methods refers to methods in object-oriented programming (OOP), in which each method is a procedure associated with a message and an object.

a. public DetailsResponse details(String packageName)—this method returns an object of type DetailsResponse that contains information about the requested mobile application in Google Play Store. (E.g. name, rating, description, size, etc.)

b. public BrowseResponse categories(String category)—this method returns a BrowseResponse object that contains a list of subcategories of a specified category of mobile application.

c. public DeliveryResponse delivery(String packageName, int versionCode, int offerType, String downloadToken)—this method returns a DeliveryResponse object that contains information about files of a selected mobile application, links in which they can be downloaded, file sizes, etc.

This third party library may also include command lines or requests for handling responses from Google Servers, and requesting for user reviews on selected mobile application, information on paid mobile applications, recommended mobile applications etc.

Figure 7:
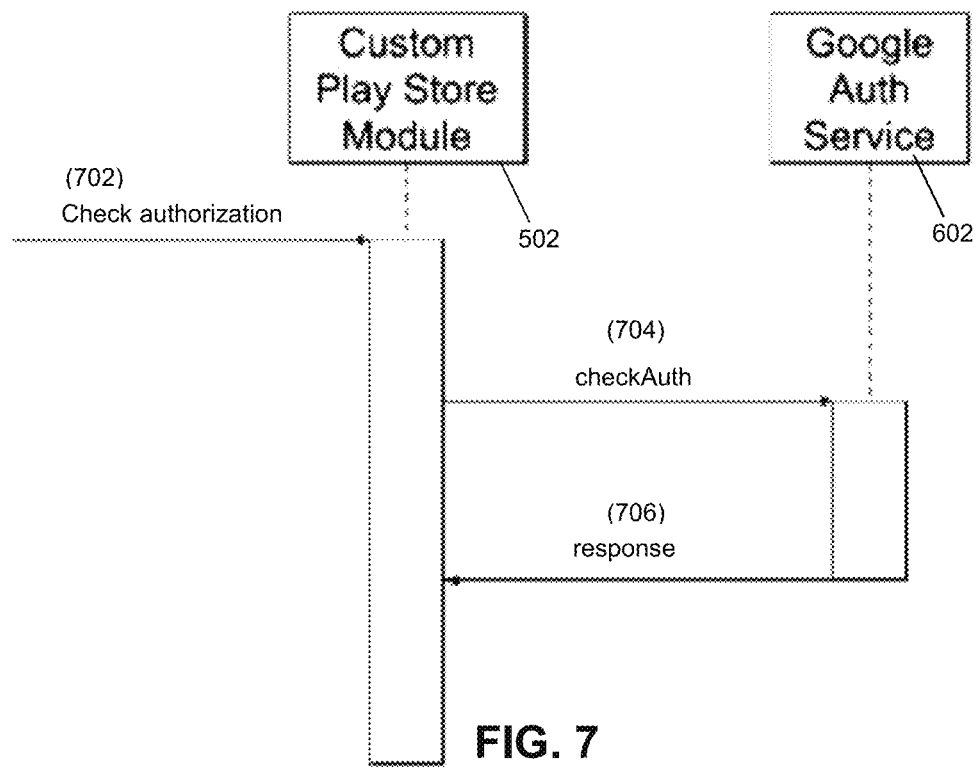
FIG. 7 illustrates an authorization process with Google Authentication Service according to an example of the present disclosure.

FIG. 7 further illustrates the system of FIG. 6, with focus on the specific interaction between the Custom Play Store Module 502 and the Google Auth Service 602. The Direct Play Store Module 306 may have the same features as those illustrated for the Custom Play Store Module 502 in FIG. 7.

In order for a mobile application requested by a user through a mobile application store of an example of the present disclosure to be installed, a saved Google user account is needed. Such Google user account has to be authorized before any mobile application can be downloaded from Google Play Store. The Google user account also has to be authorised when forming any request for information from Google Play Store.

The authorization process has 3 stages a, b and c as follows.

a. Request android_id(gsf_id) from local Google Play service (com.google.android.gsf). In this step, request for unique gsf_id from Google Play Services is performed to start the authentication process. An example of such gsf_id request in java is as follows.
context.getContentResolver( ).query(Uri.parse("content://com.google.android.gsf.gservices"), null, null, new String[ ] {"android_id"}, null);

b. Token request from database manager account. In this step, authentication token of user's Google account is retrieved from a database manager account, which is part of the Accounts database 206. An example of such token request in shell script is as follows.
sqlite3/data/system/users/0/accounts.db select authtoken from authtokens where type like '%androidynarket%' limit 1 c. Forming a device information provider. In this step, device information required for authentication such as country, time zone etc, are obtained and a device information provider is formed to facilitate the authentication. An example of such request in java is as follows.
NativeDeviceInfoProvider deviceInfoProvider=new NativeDeviceInfoProvider( );
deviceInfoProvidersetContext(context);
deviceInfoProvidersetLocaleString(Locale.getDefault( ).toString( ));

If valid parameters are entered at the above stages a, b, and c, when forming any request for downloading a mobile application or any request for information to Google Services, an answer will be returned from the relevant Google Services with the requested download or information. Information that may be requested from the relevant Google Services include a request for mobile application categories, request for detailed information about a mobile application, requesting information about the delivery (i.e. downloading) of a mobile application, etc. If the parameters are incorrectly entered or generated, then an answer "Authorization required" will be returned by the relevant Google Services.

With reference to FIG. 7, in the present example, a request that requires authorization check or a specific check authorization request (check authorization) 702 is sent to the Custom Play Store Module 502 every time a user requests for information to Google Services through the Custom Play Store User Interface 404. In the case of the mobile application store of FIG. 3, the same check authorization request 702 is sent to the Direct Play Store Module 306 every time a user requests for information to Google Services through the mobile application of FIG. 3. Upon receipt of such authorization request 702, the Custom Play Store Module 502 or the Direct Play Store Module 306 generates and sends an authorization request or requests (checkAuth) 704 in accordance with the 3 stages of the authorization process mentioned above to Google Auth Service 602. Google Auth Service 602 then returns a response 706. The response 706 can be a positive response that indicates successful authentication in the case of valid entries or a negative response indicating failed authentication in the case of invalid entries or errors. The Accounts database 206 containing Google user account information would be accessed during the authorization check process of FIG. 7. The authentication process may be displayed in the Custom login screen 210 of FIG. 2, Custom Play Store User Interface 404 of FIG. 4 or the mobile application store in the website of FIG. 3.

The Custom Play Store Module 502 or Direct Play Store Module 306 will work with the Player 112 to display any error message on the display of the PC 102 for the user to view.

Figure 8:
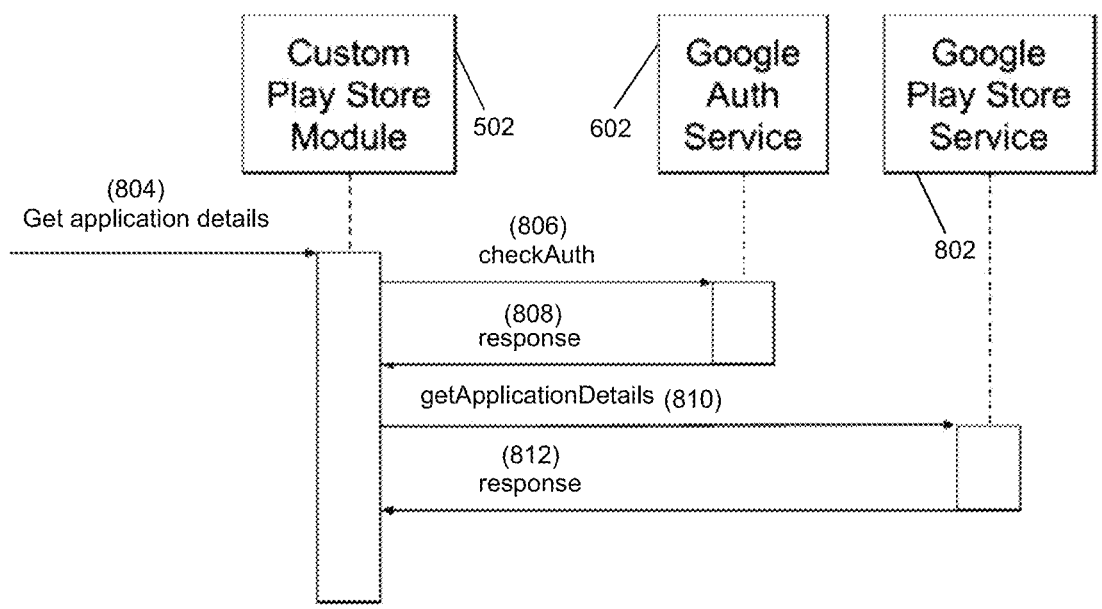
FIG. 8 illustrates a process to get application details of a mobile application according to an example of the present disclosure.

FIG. 8 illustrates sending a request that requires authorization check to the Custom Play Store Module 502 when a user uses the mobile application store of FIG. 4 to trigger such request. Although the Custom Play Store Module 502 is featured, it is appreciated that the Direct Play Store Module 306 may have the same features as the Custom Play Store Module 502 in FIG. 8.

In the example of FIG. 8, the request that requires authorization check is a user request to get detailed information of a specific mobile application from Google Play Store. Such user request can be made through the Custom Play Store User Interface 404 or through the mobile application store of FIG. 3 in the case of use of the Direct Play Store Module 306. Firstly, authorization check takes place according to the steps illustrated by FIG. 7. Specifically, the request to get application details 804 is sent to the Custom Play Store Module 502, or the Direct Play Store Module 306 in the case the user uses the mobile application store of FIG. 3. The Custom Play Store Module 502 or the Direct Play Store Module 306 generates and sends a request or requests (checkAuth) 806 to Google Auth Service 602. Google Auth Service 602 then returns a response 808 to the Custom Play Store Module 502 or Direct Play Store Module 306.

Assuming the response 808 is a positive response that indicates successful authentication, the Custom Play Store Module 502 or the Direct Play Store Module 306 then generates and sends a get application details request (getApplicationDetails) 810 to Google Play Store Service 802. The get application details request 810 may be generated through a method call as follows.
PlayStoreApi.details(String packageName) (third-party library Play Store Api)

The parameter related to the mobile application name has to be specified in the method call. Google Play Store Service 802 is a service provided by Google to handle requests pertaining to the Google Play Store. After Google Play Store Service 802 receives the application details request (getApplicationDetails) 810, the Google Play Store Service 802 returns a response 812 to the Custom Play Store Module 502 or Direct Play Store Module 306. The response 812 can be a positive response that provides the requested application details, which may include name, rating, description, file size, etc. or a negative response indicating an error message. On receiving the response 812, the Custom Play Store Module 502 or Direct Play Store Module 306 may then work with the Player 112 to display the application details on the display of the PC 102 for the user to view. The requested application details may be displayed in the Custom Play Store User Interface 404 of FIG. 4 or the mobile application store in the website of FIG. 3.

The Custom Play Store Module 502 or Direct Play Store Module 306 will work with the Player 112 to display any error message on the display of the PC 102 for the user to view.

Figure 9:
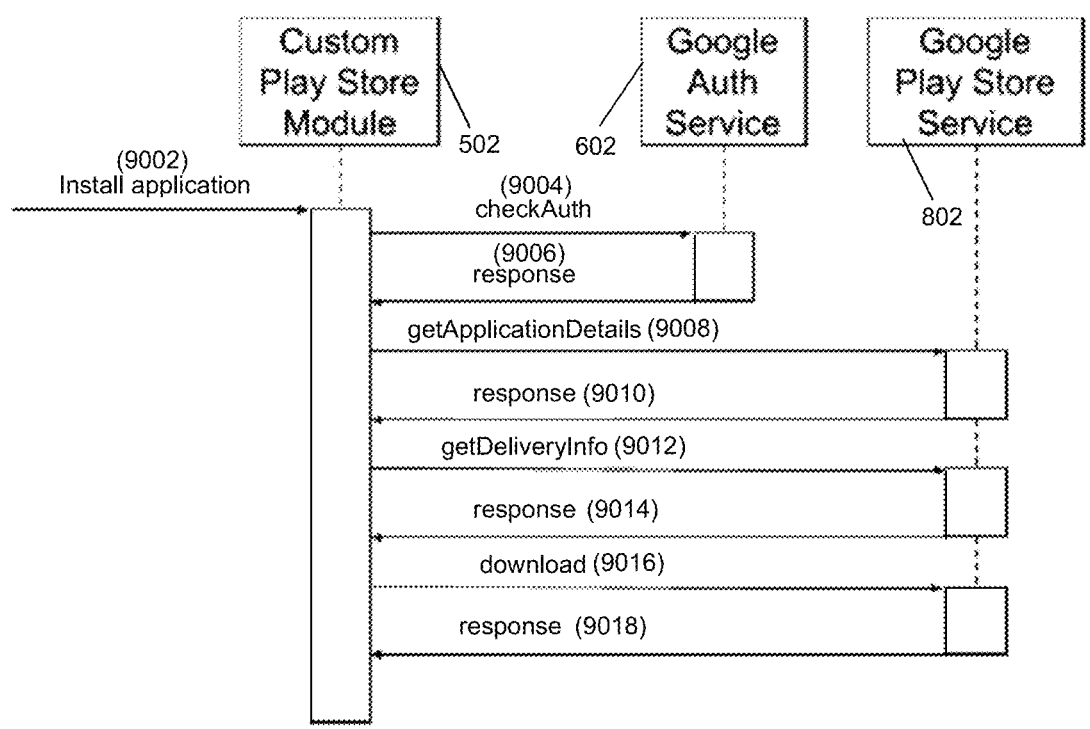
FIG. 9 illustrates a process to install a selected mobile application according to an example of the present disclosure.

FIG. 9 illustrates sending a request that requires authorization check to the Custom Play Store Module 502 when a user uses the mobile application store of FIG. 4 to trigger such request. Although the Custom Play Store Module 502 is featured, it is appreciated that the Direct Play Store Module 306 may have the same features as the Custom Play Store Module 502 in FIG. 9. FIG. 9 illustrates the operations taking place in the examples of FIG. 3 and FIG. 4.

In the example of FIG. 9, the request that requires authorization check is a user request to install a specific mobile application from Google Play Store. Such user request can be made through the Custom Play Store User Interface 404 or through the mobile application store of FIG. 3 in the case of use of the Direct Play Store Module 306. Firstly, authorization check takes place according to the steps illustrated by FIG. 7. Specifically, the request to install a specific mobile application (Install application) 9002 is sent to the Custom Play Store Module 502, or the Direct Play Store Module 306 in the case the user uses the mobile application store of FIG. 3. The Custom Play Store Module 502 or the Direct Play Store Module 306 generates and sends a request or requests (checkAuth) 9004 to Google Auth Service 602. Google Auth Service 602 then returns a response 9006 to the Custom Play Store Module 502 or Direct Play Store Module 306.

Assuming the response 9006 is a positive response that indicates successful authentication, the Custom Play Store Module 502 or the Direct Play Store Module 306 then generates and sends a get application details request (getApplicationDetails) 9008 to Google Play Store Service 802. The get application details request 9008 may be generated through a method call as follows.

PlayStoreApi.details(String packageName) (third-party library Play Store Api)

The parameter related to the mobile application name has to be specified in the method call. After Google Play Store Service 802 receives the application details request 9008, the Google Play Store Service 802 returns a response 9010 to the Custom Play Store Module 502 or Direct Play Store Module 306. The response 9010 can be a positive response that provides the requested application details, which may include name, rating, description, file size, etc. or a negative response indicating an error message. On receiving the response 9010, the Custom Play Store Module 502 or Direct Play Store Module 306 may then work with the Player 112 to display the application details on the display of the PC 102 for the user to view.

During delivery or downloading of the mobile application, the Custom Play Store Module 502 or Direct Play Store Module 306 may generate and send a get Delivery Information (getDeliveryInfo) request 9012 to Google Play Store Service 802. Google Play Store Service 802 then returns a response 9014. The response 9014 may be a positive response providing Delivery Information, or a negative response indicating an error message. The Delivery Information refers to downloading status of the mobile application. On receiving the response 9014, the Custom Play Store Module 502 or Direct Play Store Module 306 may then work with the Player 112 to display the Delivery Information on the display of the PC 102 for the user to view.

To request for downloading of the mobile application, the Custom Play Store Module 502 or Direct Play Store Module 306 generates and sends a download request 9016 to Google Play Store Service 802 and the Google Play Store Service 802 returns a response 9018. The response 9018 may be a positive response allowing the download to take place, or a negative response indicating an error message. Installation of the mobile application and running of the installed mobile application through request by the Player 112 takes place after downloading.

The detailed sequence of actions performed during the mobile application installation process summarized in steps 9004 to 9018 of FIG. 9 is as follows.

a. Check whether the required data is entered for Google authorization (i.e. android_id, token)

b. Downloading of the mobile application involves the following steps:

1) requesting for detailed information about the mobile application through the method call: PlayStoreApi.details (String packageName) (third-party library Play Store Api);

2) requesting for information about the mobile application delivery through the method call: PlayStoreApi.delivery( . . . ) (third-party library Play Store Api);

3) downloading apk file of the mobile application;

4) Downloading an obb file for "Checking the presence of additional files in the application" and downloading the additional files;

c. Installing the downloaded mobile application (shell script: pm install packageName)

The Custom Play Store Module 502 or Direct Play Store Module 306 will work with the Player 112 to display any error message on the display of the PC 102 for the user to view.

Any displaying on the display of the PC 102 for user viewing described above may be displayed in the Custom Play Store User Interface 404 of FIG. 4 or the mobile application store in the website of FIG. 3.

Figure 10:
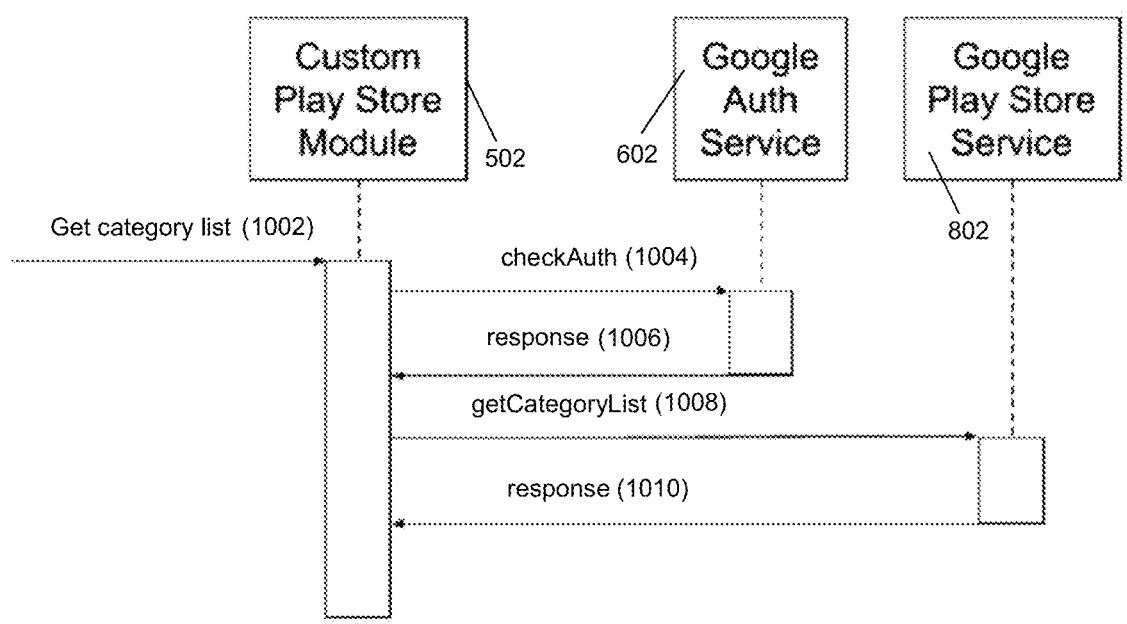
FIG. 10 illustrates a process to get a category list pertaining to genre of mobile applications according to an example of the present disclosure.

FIG. 10 illustrates sending a request that requires authorization check to the Custom Play Store Module 502 when a user uses the mobile application store of FIG. 4 to trigger such request. Although the Custom Play Store Module 502 is featured, it is appreciated that the Direct Play Store Module 306 may have the same features as the Custom Play Store Module 502 in FIG. 10.

In the example of FIG. 10, the request that requires authorization check is a user request to get a list of categories pertaining to genre of mobile applications from Google Play Store. Such user request can be made through the Custom Play Store User Interface 404 or through the mobile application store of FIG. 3 in the case of use of the Direct Play Store Module 306. Firstly, authorization check takes place according to the steps illustrated by FIG. 7. Specifically, the request to get category list 1002 is sent to the Custom Play Store Module 502, or the Direct Play Store Module 306 in the case the user uses the mobile application store of FIG. 3. The Custom Play Store Module 502 or the Direct Play Store Module 306 generates and sends a request or requests (checkAuth) 1004 to Google Auth Service 602. Google Auth Service 602 then returns a response 1006 to the Custom Play Store Module 502 or Direct Play Store Module 306.

Assuming the response 1006 is a positive response that indicates successful authentication, the Custom Play Store Module 502 or the Direct Play Store Module 306 then generates and sends a get category list request (getCategoryList) 1008 to Google Play Store Service 802. The get category list request 1008 may be generated through a method call as follows.

PlayStoreApi.categories(String category) (third-party library Play Store Api)

The parameter related to the category has to be specified in the method call. After Google Play Store Service 802 receives the get category list request 1008, the Google Play Store Service 802 returns a response 1010 to the Custom Play Store Module 502 or Direct Play Store Module 306. The response 1010 can be a positive response that provides the requested category list or a negative response indicating an error message. On receiving the response 1010, the Custom Play Store Module 502 or Direct Play Store Module 306 may then work with the Player 112 to display the requested category list on the display of the PC 102 for the user to view. The requested category list may be displayed in the Custom Play Store User Interface 404 of FIG. 4 or the mobile application store in the website of FIG. 3.

The Custom Play Store Module 502 or Direct Play Store Module 306 will work with the Player 112 to display any error message on the display of the PC 102 for the user to view.

In the same manner as described with reference to FIG. 10, a list of subcategories of a specific category pertaining to a genre of mobile applications may also be requested and displayed on the display of the PC 102.

Figure 11:
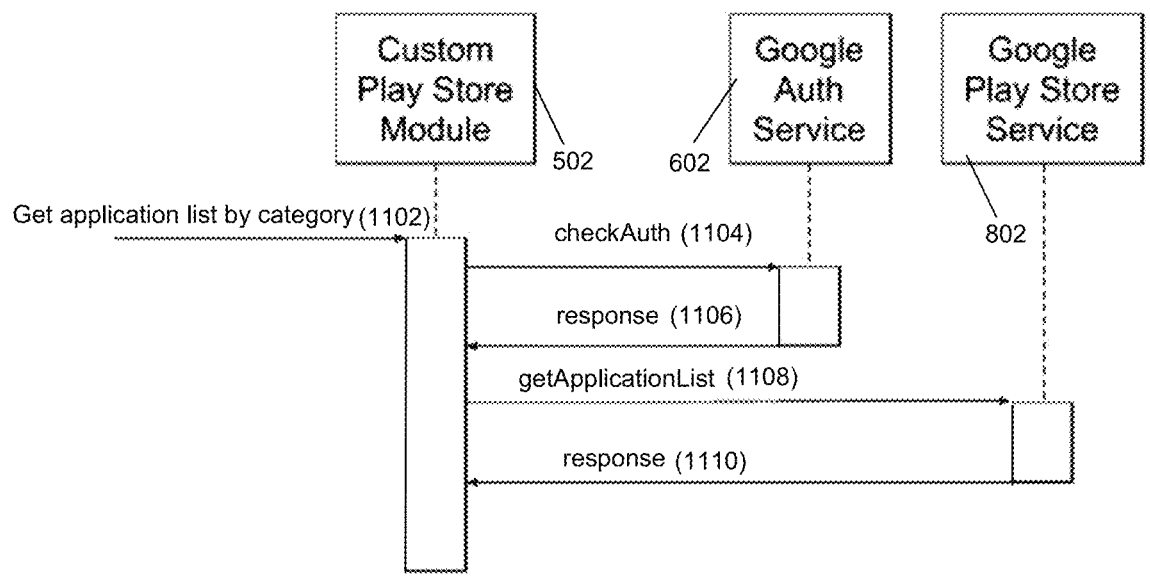
FIG. 11 illustrates a process to get a mobile application list sorted by category according to an example of the present disclosure.

FIG. 11 illustrates sending a request that requires authorization check to the Custom Play Store Module 502 when a user uses the mobile application store of FIG. 4 to trigger such request. Although the Custom Play Store Module 502 is featured, it is appreciated that the Direct Play Store Module 306 may have the same features as the Custom Play Store Module 502 in FIG. 11.

In the example of FIG. 11, the request that requires authorization check is a user request to get a mobile application list sorted by a specific category from Google Play Store. Such user request can be made through the Custom Play Store User Interface 404 or through the mobile application store of FIG. 3 in the case of use of the Direct Play Store Module 306. Firstly, authorization check takes place according to the steps illustrated by FIG. 7. Specifically, the request to get application list by category 1102 is sent to the Custom Play Store Module 502, or the Direct Play Store Module 306 in the case the user uses the mobile application store of FIG. 3. The Custom Play Store Module 502 or the Direct Play Store Module 306 generates and sends a request or requests (checkAuth) 1104 to Google Auth Service 602. Google Auth Service 602 then returns a response 1106 to the Custom Play Store Module 502 or Direct Play Store Module 306.

Assuming the response 1106 is a positive response that indicates successful authentication, the Custom Play Store Module 502 or the Direct Play Store Module 306 then generates and sends a get application list request (getApplicationList) 1108 to Google Play Store Service 802. The get application list request 1108 may be generated by forming an application iterator for the specified category using Google Play Store API.

The parameter related to the specific category has to be specified in the related method call. After Google Play Store Service 802 receives the get application list request 1108, the Google Play Store Service 802 returns a response 1110 to the Custom Play Store Module 502 or Direct Play Store Module 306. The response 1110 can be a positive response that provides the requested application list sorted by category or a negative response indicating an error message. On receiving the response 1110, the Custom Play Store Module 502 or Direct Play Store Module 306 may then work with the Player 112 to display the requested application list sorted by a specific category on the display of the PC 102 for the user to view. The requested application list sorted by a specific category may be displayed in the Custom Play Store User Interface 404 of FIG. 4 or the mobile application store in the website of FIG. 3.

The Custom Play Store Module 502 or Direct Play Store Module 306 will work with the Player 112 to display any error message on the display of the PC 102 for the user to view.

Figure 12:
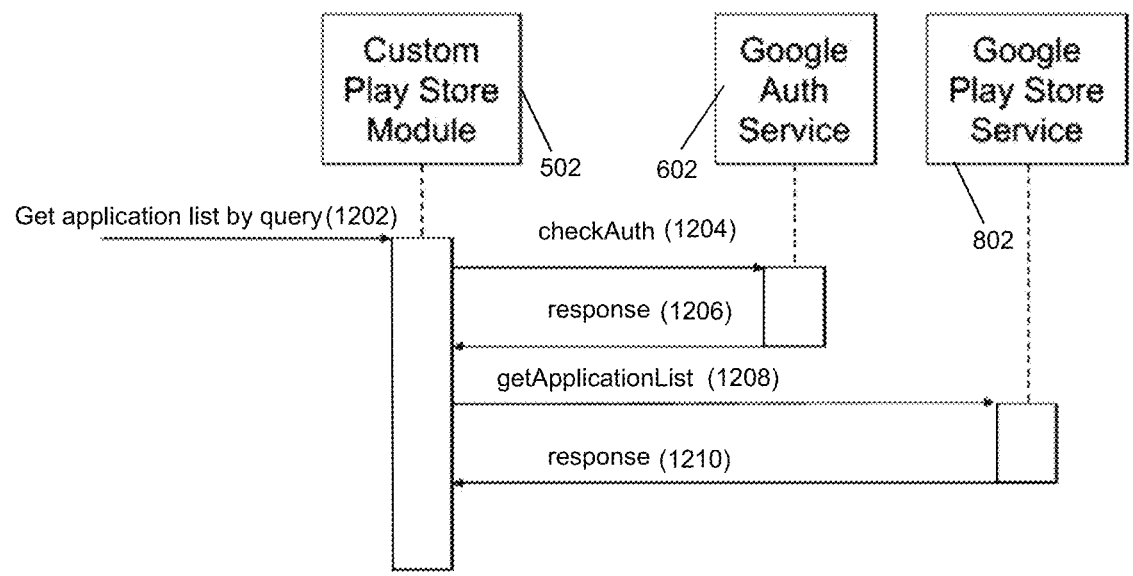
FIG. 12 illustrates a process to get a mobile application list sorted by user query according to an example of the present disclosure.

FIG. 12 illustrates sending a request that requires authorization check to the Custom Play Store Module 502 when a user uses the mobile application store of FIG. 4 to trigger such request. Although the Custom Play Store Module 502 is featured, it is appreciated that the Direct Play Store Module 306 may have the same features as the Custom Play Store Module 502 in FIG. 11.

In the example of FIG. 12, the request that requires authorization check is a keyword query (search query) entered by the user to return a mobile application list related to the keyword or keywords entered from Google Play Store. Such user query can be made through the Custom Play Store User Interface 404 or through the mobile application store of FIG. 3 in the case of use of the Direct Play Store Module 306. Firstly, authorization check takes place according to the steps illustrated by FIG. 7. Specifically, the request to get application list by the query 1202 is sent to the Custom Play Store Module 502, or the Direct Play Store Module 306 in the case the user uses the mobile application store of FIG. 3. The Custom Play Store Module 502 or the Direct Play Store Module 306 generates and sends a request or requests (checkAuth) 1204 to Google Auth Service 602. Google Auth Service 602 then returns a response 1206 to the Custom Play Store Module 502 or Direct Play Store Module 306.

Assuming the response 1206 is a positive response that indicates successful authentication, the Custom Play Store Module 502 or the Direct Play Store Module 306 then generates and sends a get application list request (getApplicationList) 1208 to Google Play Store Service 802. The get application list request 1208 may be generated by forming an application iterator for the specified keyword or keywords using Google Play Store API.

The parameter related to the specific category has to be specified in the related method call. After Google Play Store Service 802 receives the get application list request 1208, the Google Play Store Service 802 returns a response 1210 to the Custom Play Store Module 502 or Direct Play Store Module 306. The response 1210 can be a positive response that provides the requested application list sorted by the query or a negative response indicating an error message. On receiving the response 1210, the Custom Play Store Module 502 or Direct Play Store Module 306 may then work with the Player 112 to display the requested application list sorted by keyword query on the display of the PC 102 for the user to view. The requested application list sorted by keyword query may be displayed in the Custom Play Store User Interface 404 of FIG. 4 or the mobile application store in the website of FIG. 3.

The Custom Play Store Module 502 or Direct Play Store Module 306 will work with the Player 112 to display any error message on the display of the PC 102 for the user to view.

In the same manner as that described with reference to FIGS. 8, 10 to 12, recommended mobile application or a list thereof may also be requested from Google Play Store.

In one example of the present disclosure, an executable file that can be executed in the OS of the PC 104 may be created in a specific manner to facilitate running of a user selected mobile application. The executable file is associated with a particular mobile application and is used to initiate a process to run the mobile application on the OS of the PC 104. The executable file can also, if necessary, facilitate downloading and installation of necessary software, such as the emulator 108, the Player 112 and other essential components to run the mobile application in the OS of the PC 104. Additionally, downloading and installation of other software such as the Customised or Custom Play Store application described with reference to FIG. 4 may be facilitated through the executable file.

The executable file may be executed, for example, from the Customised or Custom Play Store application described with reference to FIG. 4, by the user selecting the particular mobile application presented by the Customised Play Store application for selection. The executable file may also be executed, for example, from a website when a user selects the particular mobile application to run (e.g. by clicking a play button on the website), which is described with reference to FIG. 3.

For example, one specific manner to create the executable file is that the filename of the particular mobile application is named with a format that includes a mobile application name or title, an application identifier (AppID) and_source identifier indicating a location to download the necessary software as mentioned above. Such file naming format is useful for one or more servers to:
- identify files pertaining to the mobile application such as image files (e.g. application icon image file), promotional/demonstration videos, configuration file (e.g. to configure display and/or user control settings for operation in the OS of the PC 104), etc. to download;
- identify the mobile application name or title so as to enable querying of the Google Play Store to request for downloading of the apk (or ipa file for IOS) file of the mobile application and/or more information on the mobile application; and
- identify which server or database to obtain the files pertaining to the mobile application.

An example of the file naming format for the executable file is "Apptitle_AppID_SourceID.exe".

An example of how the executable file may be used and a full user experience starting from selecting a mobile application to run to the running of the mobile application is described as follows.

Figure 14:
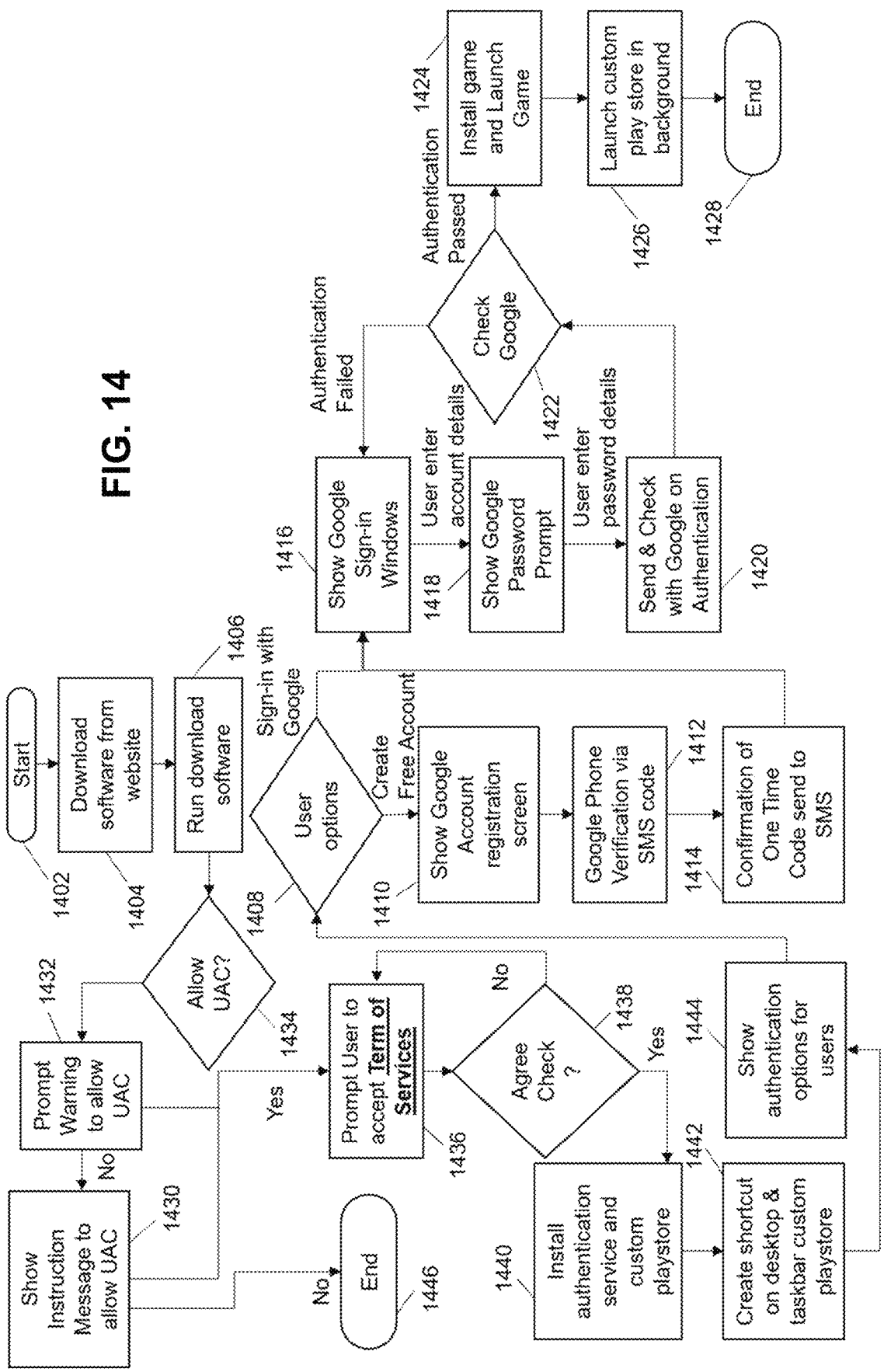
FIG. 14 illustrates a process flow to initiate from a web browser the running of a mobile application on a user machine not natively configured to run a mobile application.

With reference to FIG. 14, through a user machine, a user may, as a starting step 1402, access a website using a browser to select a play button to run a mobile application. The play button is linked to the executable file for the mobile application to be run. Selecting the play button will execute the executable file directly if it already exists in the memory of the user machine, or lead to the downloading of the executable file and its execution thereafter. In the present example, the mobile application is an Android mobile application and the mobile application store to download the mobile application is Google Play Store. Furthermore, in the present example, the mobile application is a mobile game application.

After execution of the executable file, assuming that the user machine of the user has never before downloaded and installed software including the emulator that is required to run the mobile application, the downloading and installation of the required software including the emulator, configuration file, image files, etc. will be performed at a step 1404.

In the case that the required software is already installed, a check may be performed to check that the software including the emulator is the latest version. The browser may be configured to check whether the software is downloaded and installed before, and to check that the software is the latest. The browser may have a browser extension configured for such checks. The software that is downloaded and installed may include the Customised or Custom Play Store application described with reference to FIG. 4.

Once the required software or its latest version to run the mobile application are installed, the downloaded software would be run at the user machine at a step 1406.

In the present example, running the downloaded software requires settings to be made to user machine. Hence, at a step 1434, a check is performed by a user account control (UAC) function (e.g. the UAC function provided by Windows Operating System). A first warning message 1432 "Do you allow this application to make changes to your device?" is prompted to the user. The message window of this first message 1432 comprises a "yes" button and a "no" button. If the user clicks the "no" button, a second message 1430 is prompted to the user again. The second message 1430 comprises a "yes" button and a "no" button and may contain the same contents as the first warning message 1432 and/or include an instruction to indicate that the user is required to click "yes" to proceed with the running of the mobile application. If the user clicks the "no" button again, the process ends at step 1446. Such UAC function is an optional feature and can be skipped in other examples of the present disclosure. Furthermore, such check may be configured to prompt the user with just one message to confirm the user's decision and not with two or more messages.

If the user clicks the "yes" button of the first warning message 1432 or the second message 1430, the user will be prompted to accept certain terms of service at a step 1436. The software is configured to check at step 1438 whether the user has agreed to the terms of service. The software only proceeds to step 1440 to install software components to enable an authentication service, and to download the Customised or Custom Play Store application that can run in the Operating System environment of the user machine, when the user agrees with the terms of service. The Customised Play Store application is an optional feature and it need not be downloaded in other examples of the present disclosure. In the present example, the Customised play store application is downloaded and a shortcut to run it is created at a step 1442 in a desktop view and/or taskbar (e.g. desktop and/or taskbar of Windows Operating System) of a graphical user interface of the Operating System of the user machine.

In a step 1444, the authentication service is activated and authentication options are provided to the user for selection at a step 1408. The authentication options in the present example includes an option to sign-in to his/her mobile application store account, which in this case is Google user account and an option for the user to create a user account with the mobile application store.

In the case that the user selects the option to create Google user account, a Google user account registration screen is displayed for the user to enter required details to create a user account at a step 1410. At a step 1412, the user have to perform verification via, for instance, a code delivered through Short Messaging Service (SMS) to a mobile device such as a smartphone having Android Operating System. The user account is created after confirmation at a step 1414 of, for instance, a one time code sent via SMS to the mobile device.

In the case that the user selects the option to sign-in to his/her Google user account, a Google user account sign-in window is displayed at a step 1416 for the user to enter his/her account authentication details such as username and password. At a step 1418, a Google account password prompt is shown for the user to enter password details. At a step 1420, the password details are sent for authentication and checked through Google Services. The authentication check is performed at a step 1422.

If authentication passes or is successful at step 1422, downloading and installation of the apk file, ipa file or the like of the mobile application (in this example, a mobile game application) from the mobile application store will proceed at a step 1424. After the installation, the mobile application will also be launched or run by the emulator at the step 1424. After step 1424, the custom play store application can be launched or run in the background at a step 1426 to provide easy access for the user to use the custom play store application after the user decides to end the mobile application that is running. Step 1426 is an optional step and need not be implemented in other examples. Additionally, an executable shortcut icon for fast execution of the mobile application can be created on a desktop view (e.g. the desktop of Windows) of the user machine after the mobile application is installed. After step 1426, the process flow ends at step 1428.

If authentication fails or is unsuccessful at step 1422, the process flow proceeds to step 1416 and the Google user account sign-in window is displayed again. The steps after 1416 are the same as those described above. A limited number of tries may be implemented before a lock out i.e. blocked user access and recovery can be made upon user request.

Figure 15:
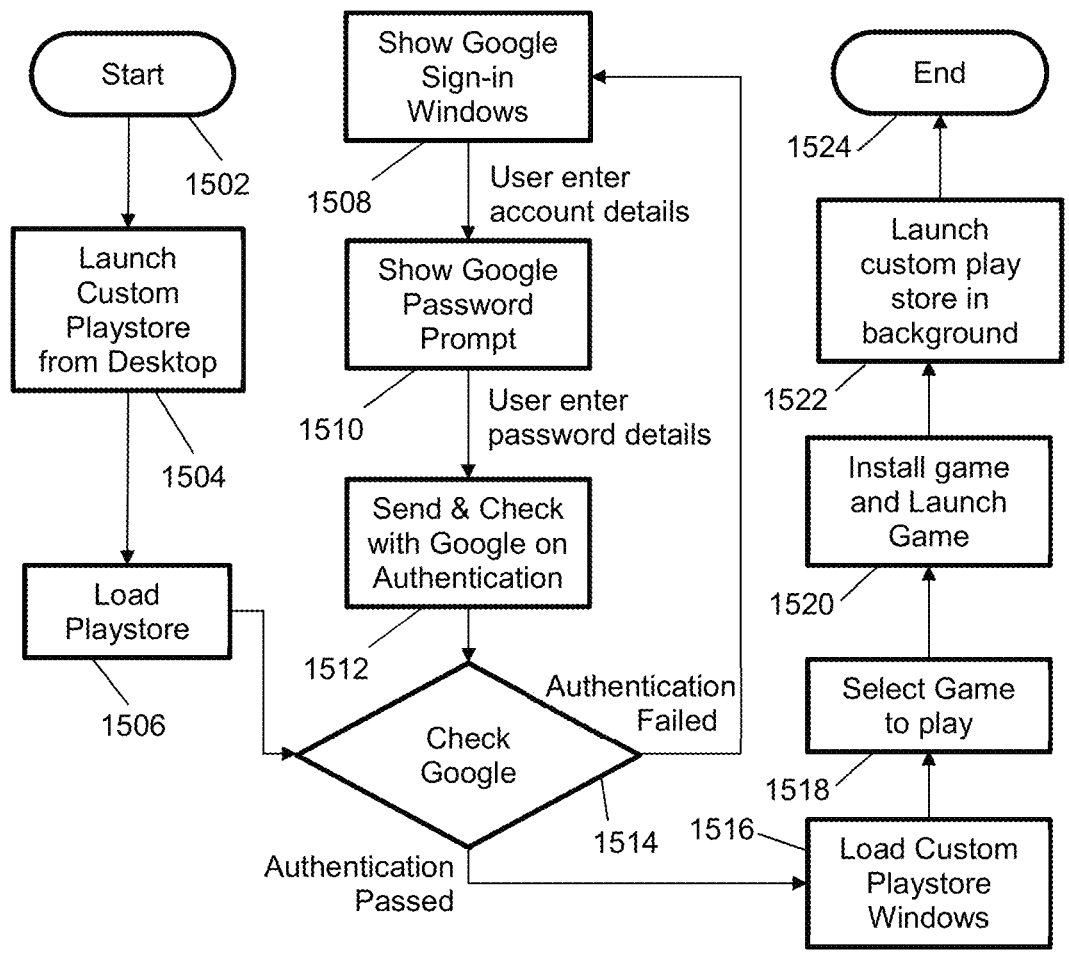
FIG. 15 illustrates a process flow to initiate to run a mobile application from a mobile application store operable in a user machine not natively configured to run the mobile application.

FIG. 15 illustrates how the downloaded and installed Customised or Custom Play Store application described with reference to FIG. 14 operates on the same user machine as that described with reference to FIG. 14. A process flow of FIG. 15 starts at a step 1502. At a step 1504, through the user machine, the user launches the Customised Play Store application from the created shortcut provided in the Desktop view of the Operating System of the user machine. At a step 1506, the Customised Play Store application is loaded and the first action loaded is an authentication check to sign-in to the Google user account of the user at a step 1514. In the example of FIG. 14, the user already entered his/her Google account authentication details and, in the present example, such details are selected by the user to be remembered. Hence, further entering of authentication details is not required and the authentication check automatically performs at step 1514.

If authentication fails or is unsuccessful at the step 1514, the Google user account sign-in window is displayed at a step 1508 for the user to enter his/her Google account authentication details such as username and password. At a step 1510, a Google account password prompt is shown for the user to enter password details. At a step 1512, the password details are sent for authentication and checked through Google Services. The authentication check is performed again at step 1514. If authentication fails or is unsuccessful at step 1514 again, the process flow proceeds to step 1508 again. A limited number of tries may be implemented before a lock out i.e. blocked user access and recovery can be made upon user request.

If authentication passes or is successful at step 1514, a graphical user interface of the Customised or Custom Play Store application will be launched at a step 1516. The graphical user interface shows a plurality of mobile applications icon images for user selection. Each mobile application icon image is associated with a specific mobile application.

At a step 1518, the user selects a mobile application icon image displayed in the graphical user interface to run the specific mobile application associated with it. The mobile application icon image is linked to the executable file for the mobile application to be run. Selecting the mobile application icon image will execute the executable file directly if it already exists in the memory of the user machine, or lead to the downloading of the executable file and its execution thereafter.

For mobile applications already downloaded and installed on the user machine, the mobile application runs immediately after the executable file is executed. However, if the selected mobile application is not already downloaded and/or installed, the mobile application will be downloaded and installed at a step 1520. The installed mobile application is then launched or run by the emulator. After step 1520, the custom play store application is run in the background at a step 1522 to provide easy access for the user to use the custom play store application after the user decides to end the mobile application that is running. Step 1522 is an optional step and need not be implemented in other examples. Additionally, an executable shortcut icon for fast execution of the mobile application can be created on a desktop view (e.g. the desktop of Windows) of the user machine after the mobile application is installed. After step 1522, the process flow ends at step 1524.

In the entire process of FIG. 14 or 15, the landing page of the mobile application store i.e. Google Play Store need not be shown on the display of the user machine. The Customised or Custom Play Store application that works in the Operating System of the user machine is provided instead. To the user, in the processes of FIGS. 14 and 15, it would appear that he or she only requires to make one selection to run the mobile application, sign in to the mobile application store, and the mobile application will be run. User experience is enhanced and improved as a result. Optionally, loading/processing windows or screens may be shown on the display of the user machine to indicate to the user that downloading and/or installation of the required software and/or the apk file, ipa file or the like of the mobile application is in progress.

Figure 13:
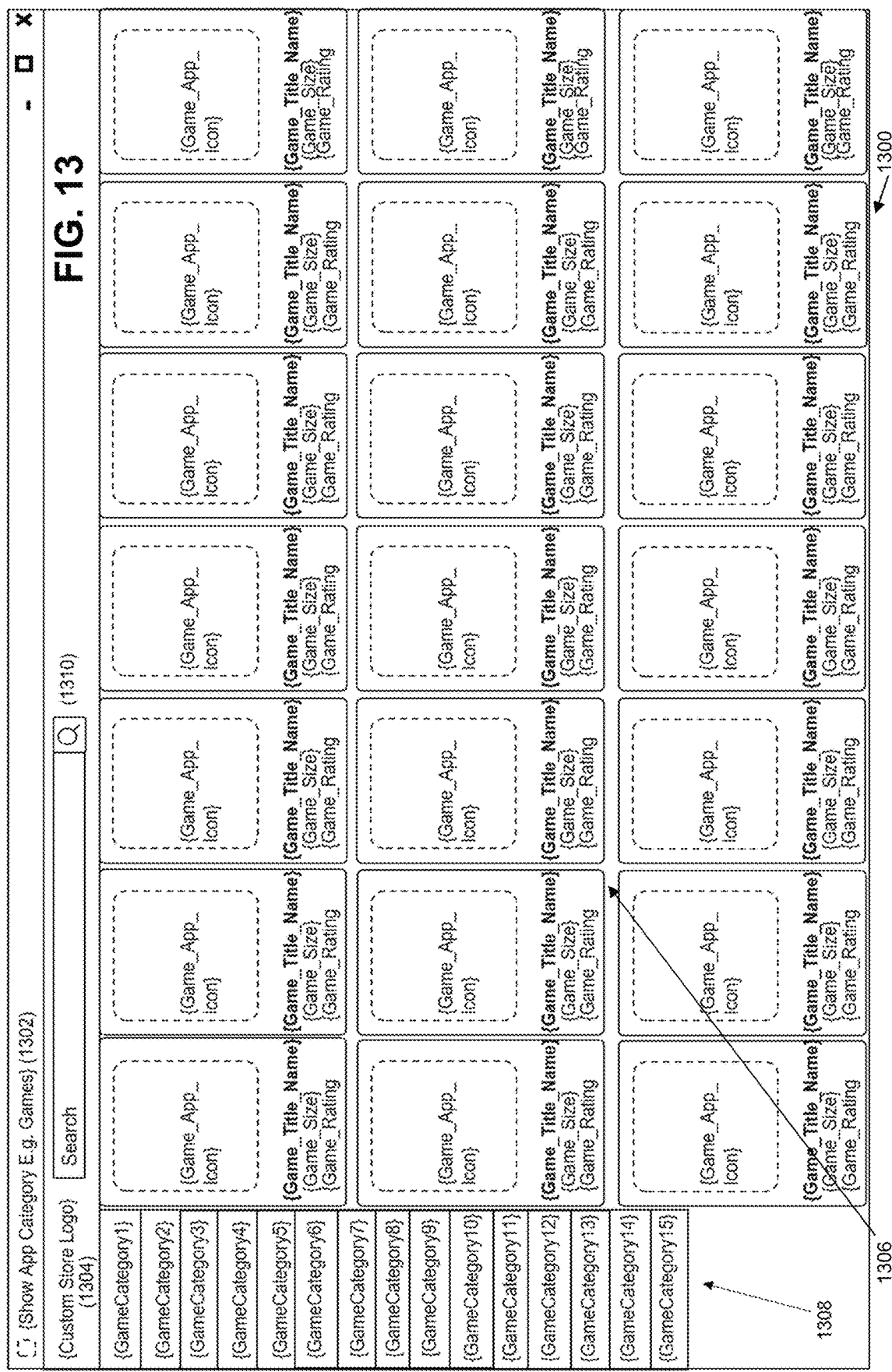
FIG. 13 illustrates a graphical user interface of a mobile application store operable in a user machine not natively configured to run a mobile application.

FIG. 13 shows an example of the graphical user interface (GUI) of the Customised or Custom Play Store application described with reference to FIG. 15. The GUI 1300 can display all of the latest content in the google play store. All the information can be obtained from Google play store through requests sent via Google Play Services. In the present example, the Customised Play Store application is specifically showing mobile applications that are for gaming. Hence, at a top of the GUI 1300, under App category 1302, "Games" can be shown. Below the App category 1302, there is a location for placing a logo 1304 representative of the customised play store application. There is a search text bar 1310 to enter text to search certain games. A list 1308 of buttons for 15 different game categories is provided. Selecting each button would cause to display in a main display area 1306 one or more mobile game applications pertaining to the game category, which the button is associated with. Entering text in the search text bar 1310 and selecting to filter based on the entered text will cause to display in the main display area 1306 one or more mobile game applications pertaining to the entered text.

Figure 9A:
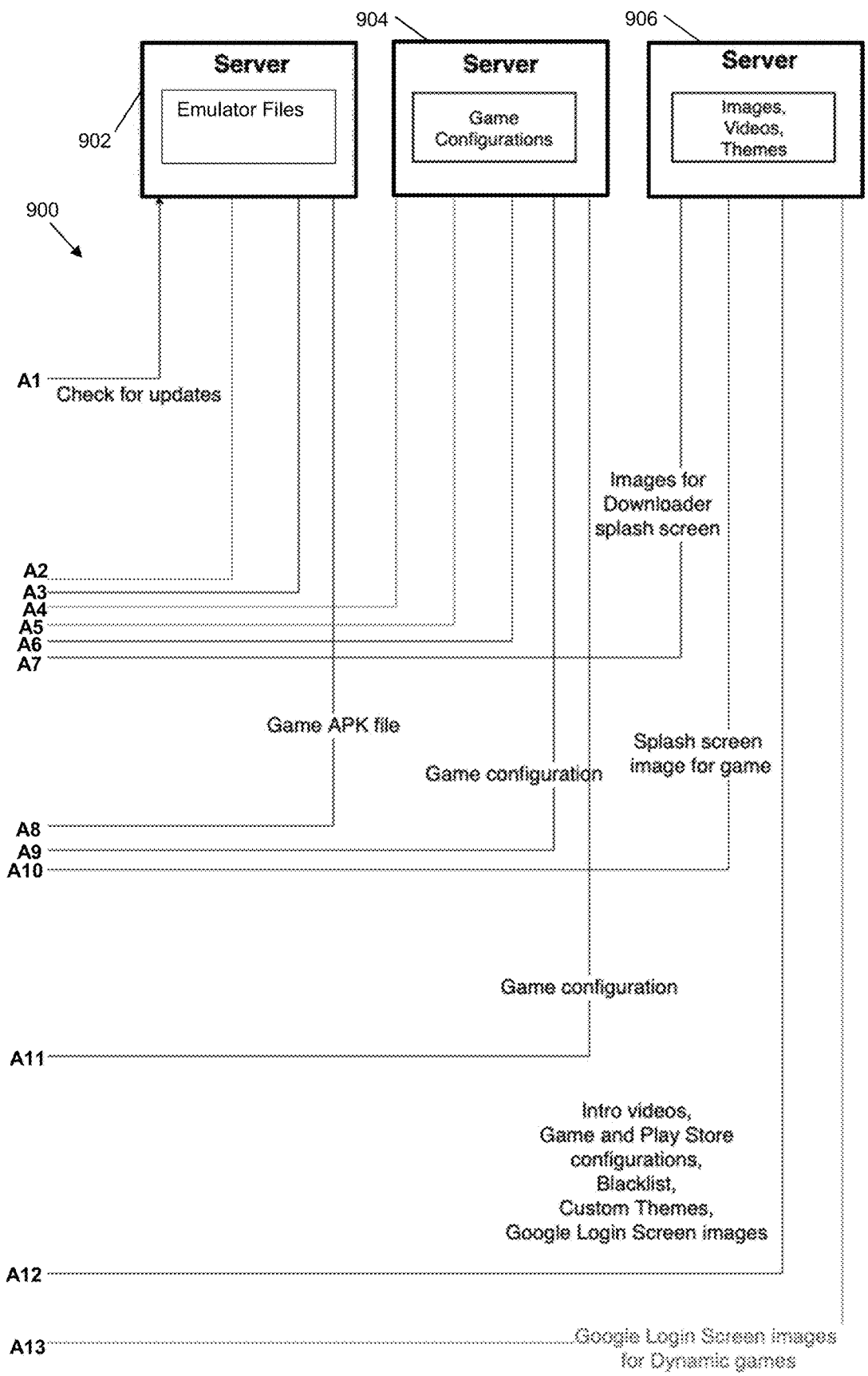
FIGS. 9A, 9B, and 9C show block diagrams of components of a system according to an example of the present disclosure.
Figure 9B:
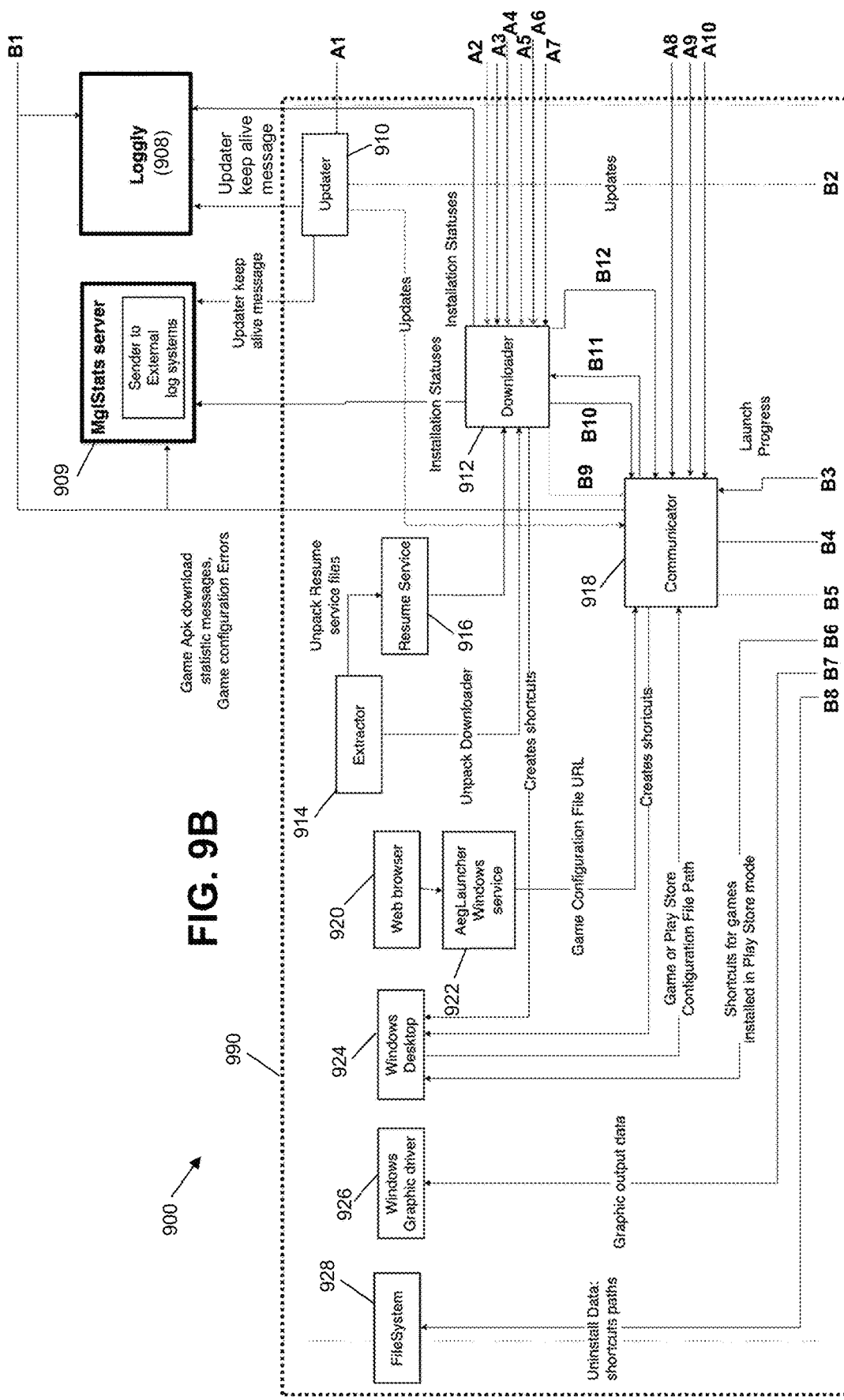
Figure 9C:
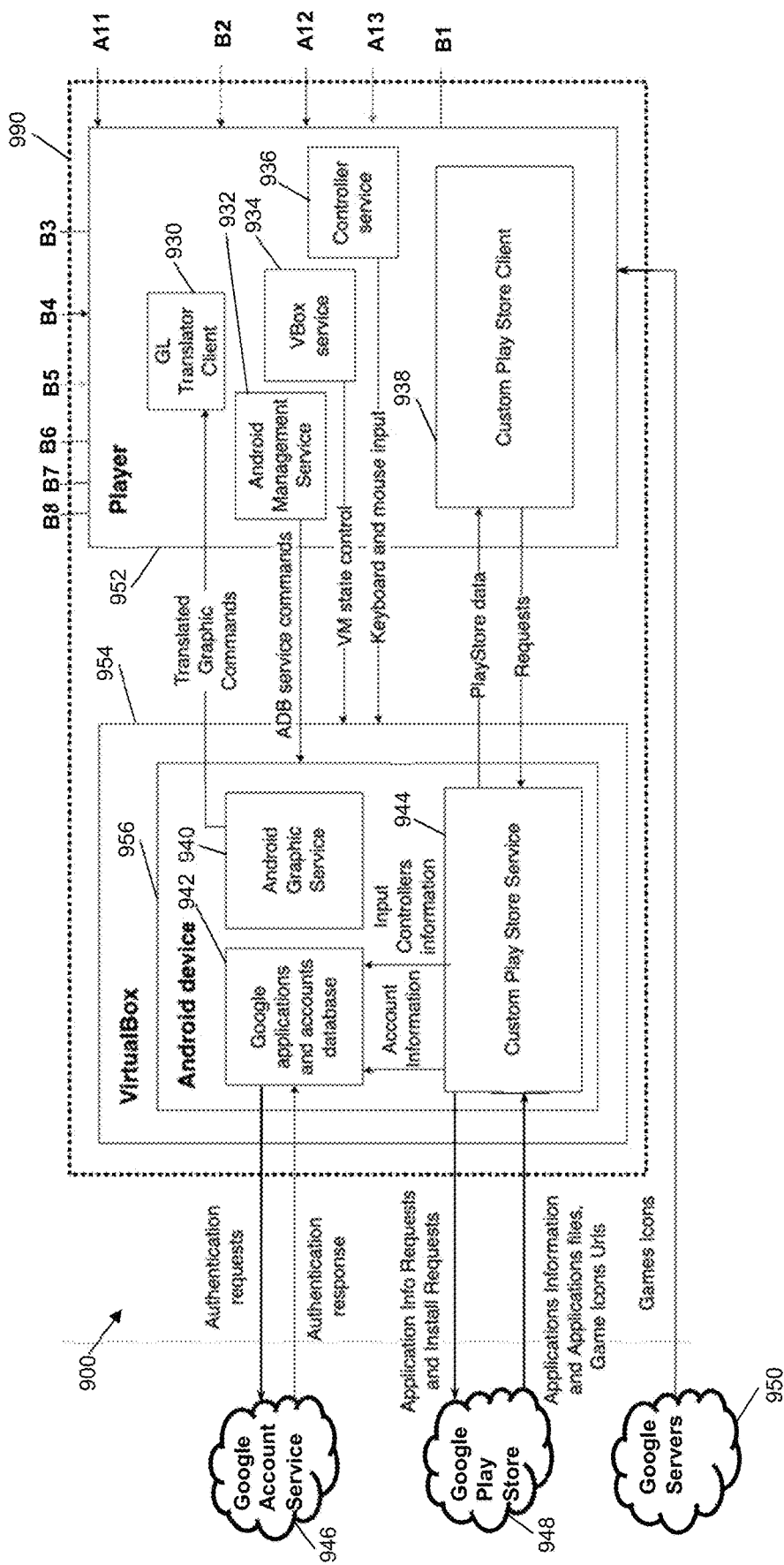

FIGS. 9A, 9B and 9C are all parts of a same block diagram illustrating an example of a system architecture of a system 900. The system architecture comprises hardware/software components of the system 900. The system 900 enables a user selected mobile application to operate in an operating system environment (in this example, Windows Operating System) of a user machine 990 (marked out by dotted lines in FIGS. 9B and 9C) i.e. a machine belonging to a user, wherein such operating system environment is not natively configured for running mobile applications. For illustration purposes, in the present example, the user machine 990 is specifically a desktop computer. In the present example, the mobile application is a mobile game application and it is specifically an Android Operating System application that is available in Google Play Store (948 in FIG. 9C). The game of the mobile application can be a Dynamic game or a static game. A Dynamic game is of the type that players can condition their optimal actions on what other players have done in the past. In other examples, the present system 900 can be adapted accordingly to support non-gaming mobile applications and/or user machines such as a Television box, video game console, and the like, which are not natively configured for running mobile applications of a particular mobile device operating system (e.g. Android, IOS and the like).

FIG. 9A shows three servers 902, 904 and 906. Server 902 has 4 action lines A1, A2, A3, A8 representing interaction with other components of the system 900. Server 904 has 5 action lines A4, A5, A6, A9 and A11 representing interaction with other components of the system 900. Server 906 has 4 action lines A7, A10, A12, and A13 representing interaction with other components of the system 900. More details on each action line will be provided later. Although three separate servers 902, 904 and 906 are described in the present example, it is appreciated that in other examples, they may be integrated into one server, they may be configured as server instances or separate databases operated through one or more servers, they may operate based on cloud technology, and/or their functions may be performed through more than one servers.

Server 902 is for storing Emulator files and the customised or custom play store application (i.e. a mobile application store operable in the operating system of the user machine 990) described with reference to FIGS. 13 to 15. In order for the user of the system 900 to run mobile applications on the user machine 990, Emulator files has to be downloaded from Server 902 and installed on the user machine 990. Optionally, the customised play store application can also be downloaded and installed to facilitate selection of mobile applications to run. The Emulator files enables an emulator that can be operated in the operating system environment of the user machine 990 to run the mobile application. The latest version of the emulator and the customised play store application are stored in Server 902 for download. Other components of the system 900 can request for updated versions of the emulator and the customised play store application from Server 902. Optionally, in one example, not all mobile applications are obtained from Google Play Store (948 in FIG. 9C) and some proprietary .apk or .ipa files of mobile applications can be downloaded directly from Server 902. Creators of such proprietary mobile applications can authorise to supply them through such channel, which is separate from the Google Play Store (948 in FIG. 9O). The Creators may also additionally supply them through the Google Play Store (948 in FIG. 9C).

Server 904 is for storing Game configurations, for instance, files relating to the configuration data required to operate mobile applications on the user machine 990. Such configuration data may include preferred display resolution, screen orientation (landscape or portrait), and other display settings to display the graphical contents of the mobile application, and preferred keyboard keys/mouse actions, captured gesture actions or touchscreen actions to operate the mobile application. Such pre-determined configuration data may be re-configured by users according to their preference at the user machine 990.

Server 906 is for storing images, videos, and themes. The images may be application icon and/or representative images of the mobile applications for displaying in a file folder, a graphical user interface (GUI) of the customised or custom play store application (i.e. a mobile application store operable in the operating system of the user machine 990), and/or web browser on a display of the user machine 990. The videos may be promotional videos, demonstration videos and the like relating to mobile applications that are, for instance, presented or made available through the GUI of the customised play store application and/or a web browser of the user machine 990 for users to view. The Server 906 may also store a list indicating a list of mobile applications that is not to be shown in the GUI of the customised play store application. Such mobile applications can be those that will not work well or optimally in the operating system of the user machine 990 or those that contain content that is unsuitable. The themes are mainly for aesthetic purposes, for instance, to enable users to customise display of the GUI of the customised play store application. Google user account login screen images are stored in Server 906 as well and these images are used when the user is requested to login to Google user account to allow downloading of the mobile application from Google Play Store (948 in FIG. 9C). Configurations for the GUI of the customised play store application may be stored in Server 906 as well. Furthermore, splash screen images for each mobile application and for a Downloader program (i.e. Downloader 912 in FIG. 9B) activated to download software are stored in Server 906.

FIG. 9B shows a Loggly server 908 and an MglStats server 909, which are external or remote to the user machine 990 and communicates with the user machine 990 via the Internet. FIG. 9B shows the user machine 990 comprising an Updater 910, a Downloader 912, a Communicator 918, an Extractor 914, a Resume Service 916, a Web browser 920, an AegLauncher Windows Service 922, Windows Desktop 924, a Windows Graphic driver 926, and a File (Windows) System 928. The Updater 910, Downloader 912, Communicator 918, Extractor 914, Resume Service 916, and AegLauncher Windows Service 922 are proprietary components to be downloaded for the operation of the emulator.

The Loggly server 908 is basically a log management server and in the present example, refers specifically to SolarWinds Loggly, which is a cloud-based log management and analytics service provider. The Loggly server 908 takes in input from action line B1, which supplies data relating to game .apk download (e.g. which .apk is downloaded), statistical messages (e.g. user download, gameplay history, user game performance statistics etc.), and game configuration errors (e.g. errors occurring while a user is playing a mobile game application) to be stored in the Loggly server 908. Although the present example uses the Loggly server 908, it is appreciated that other cloud-based or non-cloud based server for log management may also be used in other examples of the present disclosure. The Loggly server 908 also receives and stores messages from the Updater 910 that sends keep alive messages to it.

The Updater 910 is used to check for latest version of the emulator and the customised play store application with the Server 902 via action line A1 and to notify the Loggly Server 908 via the keep alive messages that the Updater 910 is functioning. Such keep alive messages may also notify whether the software versions required to run the mobile application are the latest. The Updater 910 can be the Windows Service provided by the Windows Operating System of the user machine that is activated to constantly monitor new software versions. The Updater 910 can be configured to operate in background mode, which silently downloads and installs updated software.

The MglStats server 909 refers to a server for storing game player statistics. The MglStats server 909 is a log system external to the user machine 990. Specifically, in the present example that is directed to mobile game applications, MglStats stands for Mobile gaming league Statistics, which comprise player information pertaining to a Mobile gaming league such as ranking, performance, play history, gaming leagues joined for specific games, etc. The MglStats server 909 also receives and stores messages from the Updater 910 that sends keep alive messages to it.

The Updater 910 is configured to also notify the MglStats server 909 via the keep alive messages that the Updater 910 is functioning. Such keep alive messages may also notify whether the software versions required to run the mobile application are the latest.

Furthermore, the Updater 910 notifies to the Communicator 918 the updates received from the Server 902 via action line A1 so that the Communicator 918 can request to have the updates downloaded and installed, or if the Updater 910 already downloaded the updates, the Communicator 918 can operate to apply the updates, for instance, to have the updates installed. The Updater 910 is configured to send updates received from the Server 902 via action line B2 to a Player 952 (shown in FIG. 9C). The Player 952 is similar to the player 112 described with reference to earlier figures. More details on the Player 952 will be provided later.

The downloader 912 is configured to connect to the three servers 902, 904 and 906 and interact with them via action lines A2 to A7. The main purpose of the downloader 912 is to request to download software/information from the three servers 902, 904, and 906. Action line A2 represents downloading of splash screen (may be based on HTML) for Dynamic games from the Server 902 to the downloader 912 upon request by the downloader 912. Action line A3 represents downloading of the emulator and/or the customised play store application from the Server 902 to the downloader 912 upon request by the downloader 912. Action line A4 represents downloading of specific Dynamic game configurations i.e. configuration data specifically required for selected Dynamic games to run at the user machine 990 from the Server 904 to the downloader 912 upon request by the downloader 912. Action line A5 represents downloading of Dynamic game common configurations i.e. configuration data commonly required by all types of Dynamic games to enable them to run on the user machine 990 from the Server 904 to the downloader 912 upon request by the downloader 912. Action line A6 represents downloading of non-Dynamic or static game configurations i.e. configuration data required for the user machine 990 to run them from the Server 904 to the downloader 912 upon request by the downloader 912. Action line A7 represents downloading of images for displaying a splash screen of the downloader 912 on a display of the user machine 990.

The downloader 912 is configured to communicate with the Loggly server 908 and the MglStats server 909 to send software installation statuses to the Loggly server 908 and the MglStats server 909 for storage. The downloader 912 is further configured to initiate creation of shortcuts to run the emulator and/or the Customised Play Store application on the Windows Desktop 924 after they are installed. The Web browser 920, AegLauncher Windows Service 922, Windows Desktop 924, Windows Graphics driver 926 and File System 928 are applications of the MS Windows Operating System (OS).

The Web browser 920 is an application for accessing websites at the user machine 990.

The AegLauncher Windows Service 922 is a proprietary Windows service created to interface the Web browser 920 with the Communicator 918 so that they can interact with each other. For example, a user may select on the Web browser 920 a play button to run the mobile application. Thereafter, a game configuration file url indicating a location of Server 904 to download the game configuration files of mobile application will be provided from the Web browser 920 to the Communicator 918 through the AegLauncher Windows Service 922. The Communicator 918 would then be able to communicate the game configuration file url to other components in the system 900. This game configuration file url may be communicated to the downloader 912 from the Communicator 918. The downloader 912 then communicates with Server 904 to have the game configuration files downloaded.

The Windows Desktop 924 refers to the desktop view of the Windows Operating System (OS), which can display files and/or shortcuts to files for quick execution of applications.

The Windows Graphics driver 926 refers to software that allow Windows OS and Windows-based programs to use graphics hardware of the user machine 990.

The File System 928 refers to Windows Services for installing and uninstalling files, file storage indexing, and recording of file access paths.

The Extractor 914 is an application configured to unpack resume service files to enable a resume service function 916 and to unpack program/application files of the downloader 912. The Extractor 914 may be a function of the executable file described earlier. The downloader 912 can operate only after it is unpacked. When an operation at the user machine 990 to download the downloader 912 is disrupted, the resume service function 916 is used to resume the downloading of the downloader 912 when the user machine 990 is ready to continue with the downloading. Furthermore, the closing or stopping of downloading service provided by the downloader 912 is monitored by the resume service function 916. Hence, when the downloader 912 is operating to download certain software and there is a disruption to close the application of the downloader 912 or to stop the downloading performed by the downloader 912, the resume service function 916 is used to resume the downloading performed by the downloader 912. The resume service function 916 can be configured to enable the downloader 912 to perform downloading silently in the backend or background of the user machine 990.

The Communicator 918 is configured to work with the downloader 912. Through action line B12, the downloader 912 instructs the Communicator 918 to launch the emulator on the user machine 990 after the emulator is installed. Through action line B9, the downloader 912 sends downloaded Dynamic game result configuration obtained from Server 904 to the Communicator 918. Through action line B10, the downloader 912 sends downloaded game configurations obtained from Server 904 and configurations for the customised play store application obtained from Server 902 to the Communicator 918. Once launched by the downloader 912, the Communicator 918 receives configuration files sent via action lines B9 and B10 as input, and parses them to determine, for instance, screen size and orientation (portrait, landscape) requirements for displaying graphical contents of the user-selected mobile application on the display of the user machine 990 according to the predefined data in the configuration files.

The Communicator 918 is configured to command the downloader 912 through action line B11 to hide Google user account login screen when it is required, for instance, when the user is already registered with a Google user account and a database such as the Accounts database 206 of FIG. 2 already contains the user account information. In this case, the existing user account information in the database is retrievable for future logins without prompting the user to login again through the Google user account login screen. This provides quicker processing to run the user-selected mobile application and omits an unnecessary login step. The system 900 can be configured to allow the user to register for another user account, select a default user account for future access, and/or switch to another user account.

The Communicator 918 is configured to request to download and receive, in the present example, a proprietary game .apk file (or in other example, .apk files of proprietary non-gaming mobile applications) from Server 902 via action line A8, game configuration file or files of such proprietary game from Server 904 via action line A9, and splash screen images of such proprietary game from Server 906 via action line A10. Furthermore, the Communicator 918 is configured to create a shortcut on the Windows Desktop 924 for the proprietary game and/or for the customised play store application when they are downloaded. When executed, the shortcut supplies the Communicator 918 with a configuration file path of the mobile application associated with the shortcut that is to be run, or configuration file path of the customised play store application store associated with the shortcut that is to be run.

The Player 952 of FIG. 9C is responsible for running and operation of a user-selected mobile game application. In one example, the Player 952 comprises the customised play store application. The Communicator 918 is configured to receive launching progress of the user-selected mobile game application via action line B3 from the Player 952 of FIG. 9C. In addition to launching progress, during operation of the user-selected mobile application, the Communicator 918 is configured to monitor the status (e.g. idle, in use, downloading, etc.) of the user-selected mobile application by communicating with the Player 952. Such monitoring can be for the purposes of error detection. The Communicator 918 provides, via action line B4, the Player 952 with the downloaded game configurations obtained from Server 904 through the downloader 912 and configurations for the customised play store application obtained from Server 902 through the downloader 912. Such configurations are required for the Player 952 to run the user-selected mobile game application and the customised play store application.

The Communicator 918 also provides to the Player 952, via action line B5, Google mobile application identifier for the Player 952 to facilitate downloading of the user-selected mobile game application from Google Play Store (948 in FIG. 9C), and in the case of dynamic game, dynamic game configurations required to run such dynamic game. The configuration file or files received by the Communicator 918 from the downloader 912 may include Game.JSON data that describes the following details, for instance, .apk filename, application identifier, game name, game icon, game popup picture, screen mode (i.e. portrait or landscape, and/or resolution or aspect ratio) etc. The Communicator 918 may transform the Game.JSON data into a unified remote procedure call to the Player 952, thereby instructing the Player 952 to launch the user-selected mobile game application.

The Communicator 918 is configured to track in a record a duration and start/stop time of the use of the user-selected mobile application. From the duration of use, it can be determined how long users spend their time on the mobile application. The type and genre of the mobile application with the longest user time usage may also be obtained. From the start/stop time, it can be determined how frequent a specific mobile application is accessed and what time of a day, month or year users prefer to use the mobile application. The type and genre of the mobile application with the most frequent use or highest usage during a certain time may be identified as well. The communicator 918 may also update the record containing the time information with all mobile application that has been downloaded, along with its type and genre, which can help to identify the type and genre of the mobile application with the highest downloads. The communicator 918 may also update the record with all mobile application that has been uninstalled by a user, along with its type and genre, which can help to identify the type and genre of the mobile application with least uninstall by users. Gameplay errors and configuration errors are identified as well. Such errors and statistics are sent via line B1 to the MglStats server 909 and the Loggy Server 908 for storage. The errors can help to improve the game play experience and the statistics can determine gaming trends, which can help to decide, for instance, what games to market and promote.

With reference to FIGS. 9B and 9C, the Player 952 is configured to, via action line B8, manipulate the Windows File System 928 to add shortcut paths when shortcuts are created by various components of the system 900 and/or to update on uninstall data pertaining to mobile application uninstalled from the user machine 990. Another function of the Player 952 is to provide, via action line B7, graphics output data to the Windows Graphic driver 926 to display graphics of the mobile application that is run by the emulator. In one example, via action line B6, the Player 952 is configured to create shortcuts on Windows Desktop 924 for mobile game applications installed through the customised play store application (i.e. Play Store mode). For instance, a user selects a new mobile game application to be installed from the GUI of the customised play store application and the shortcut to the new game is created after the installation. The Player 952 provides a set of services. One service herein known as VBox service 934 enables communication between an Android Virtual Machine (i.e. Android device) 956 of a VirtualBox Server (in short "VirtualBox") 954 and the Operating System of the user machine 990. The VBox service 934 sends state controls to the Android device 956. The Player 952 comprises a GL Translator Client 930 for decoding received graphical contents from the VirtualBox 954.

During operation of the user-selected mobile game application, the GL Translator Client 930 receives a stream of GL (Graphics Language) commands from an Android Graphic Service 940 i.e. a GL Translator Encoder that is built into the Android device 956 of the VirtualBox 954. The GL commands from the Android Graphic Service 940 constitutes the graphical contents of the user-selected mobile game application. The GL Translator Client 934 passes these GL commands to a GL context renderer i.e. the Windows Graphics drive 926. The GL commands provide graphical context for displaying the frames rendered by the Windows Graphics driver 926.

The Player 952 comprises a controller service 936. During the operation of the user-selected mobile game application, the Player 952 receives controlling commands i.e. user input from the user machine 990, which may be input from, for example, keyboard, touchscreen, mouse, image capture by camera, and the like. These controlling commands are directed to control the mobile game application. Through the controller service 936, the Player 952 translates or converts these controlling commands into commands that are able to control the mobile game application, for example, touch screen's taps, swipes, and keypresses of a virtual keyboard/joystick and the like. The Player 952 refers to configuration files or data obtained from the Communicator 918 to perform the translation or conversion. Such configuration files or data are sent to the Communicator 918 from the downloader 912. After the controlling commands received at the user machine 990 are translated or converted, the Player 952 passes the translated or converted commands to the Android device 956 using a VBTouchScreen API provided by the VirtualBox 954.

Audio output and/or other output (e.g. vibration) of the mobile application are processed by the Player 952 and produced for output by, for example, an audio speaker of the user machine 990, a user hardware module that can produce vibration, representing vibration by shaking or rocking the screen displaying the graphical contents of the mobile application, representing vibration by producing certain sound, etc.

The Player 952 is configured to comprise an Android Management Service 932 i.e. an Internal Android Debug Bridge (IADB) functionality, which allows the Android device 956 of the VirtualBox 954 and the Player 952 to pass Android Debug Bridge (ADB) service commands between each other. The ADB commands allow the Player 952 to command the Android device 956 to install a game, start a game, close a game, etc.

The Player 952 may provide the Android device 956 with means to access the File system 928. The Android device 956 uses the File system 928 to load (i.e. install and run) the .apk file of the user-selected mobile application, and to store VDI (Virtual Disk Image) files of the Android device 956, which contain the File system of the Android device 956.

The Communicator 918 can be configured to determine whether the user-selected mobile game application or its latest version is installed. In the case that the Android mobile game application or its latest version is not installed, the Communicator 918 will instruct the Player 952 to connect to Google Play Store 948 and download the .apk file of the user-selected mobile game application, and instruct the Android device 956 of the VirtualBox 954 to install the .apk file. Monitoring of latest version of the mobile application can be performed through, for instance, use of technologies like a web crawler (Internet data mining tool) or other suitable tool. Once latest version of one of such files is detected, the Player 952 can be activated to automatically login to Google Play Store 948 using previously obtained Google user account details. Once login is completed, the latest versions may be downloaded and installed in the backend or background of the user machine 990.

In the present example, the Player 952 comprises a custom play store client 938, which operates in the same manner as the Custom Play Store Client 308 of FIG. 3 and FIG. 4. The custom play store client 938 is a function of the Player 952 that sends requests to a custom play store service 944 of the Android device 956. The custom play store service 944 operates in the same manner as the Custom Play Store Service 304 of FIG. 3. The custom play store service 944 is a proprietary service created to be implemented inside the Android device 956 and has a function programmed to work directly with Google Play Store 948. The custom play store service 944 can be activated to obtain Play Store data and send the obtained data to the custom play store client 938.

User inputs received through the controller service 936 can be passed through the custom play store client 938 to the custom play store service 944. For registration or authentication of a Google user account, the custom play store service 944 provides account information and/or user entry for the registration or authentication to the relevant Google applications (i.e. Google Play Services) 942. Where required, a Google accounts database is accessed to save or access Google user account information. During an authentication check to download an app in Google Play Store 948 and to obtain app information from Google Play Store 948, the relevant Google applications 942 send authentication request to Google Account Service 946 and receive authentication response from Google Account Service 946 accordingly.

Once authentication is successful, the custom play store service 944 prepares and sends application information requests, game icon url requests to know where to get game icon, and application file installation requests to Google Play Store 948. In the case of a game icon url request, in response, the requested game icon will be sent from Google servers 950 to the custom play store client 938.

It is mentioned earlier that the Communicator 918 can monitor errors and statistics and report them via line B1 to the MglStats server 909 and the Loggy Server 908 for storage. The Player 952 can also have the same monitoring and reporting function as the Communicator 918. To avoid duplication, the Player 952 may monitor and report certain errors and/or statistics and the Communicator 918 may report other errors and/or statistics. For instance, when the Player 952 is operating the customised play store application, the Player 952 focuses on monitoring and reporting errors and statistics relating to the customised play store application, and the Communicator 918 focuses on monitoring and reporting mobile game application download, operation and usage issues. In another example, all of such monitoring and reporting may be done either by the Communicator 918 or the Player 952.

When the Player 952 is operating the customised play store application, the Player 952 can obtain the following information from Server 906 via action line A12: introduction/promotional videos for games, game and play store configuration information, blacklist of mobile application and/or poor conduct of other users, custom themes for changing the appearances of the graphical user interface of the customised play store application, and/or Google login screen images for static games etc. Separately, via action line A13, the Player 952 can obtain Google login screen images for Dynamic games, which will appear different from those for static games. Such information can be displayed by the graphical user interface of the customised play store application. The system 900 can be configured such that Game configurations are received by the Player 952 via action line A11 from Server 904 when a game is selected to run through the customised play store application by a user or a game is selected to run through the Web browser 920 and the Communicator 918 instructs the Player 952 to run the game.

In one example of the present disclosure, the customized play store application that can run in the operating system of the user machine (e.g. 102 in FIG. 1 or 990 in FIGS. 9B and 9C) can be configured to display one or more mobile applications not found in the mobile application store such as the Google Play Store or the Apple Store. The displayed one or more mobile applications are selectable by a user to run on the user machine. For instance, a mobile app developer can decide to have a free or paid mobile application made available only in the customized play store application. The customized play store application can be configured to handle payment for the paid mobile application.

Examples of the present invention may have the following features.

A method for operating a mobile application store, the method comprising: executing a first mobile application store (e.g, the customized play store application described with reference to FIGS. 3, 4, and 9A to 9C) that operates in an environment of an operating system of an apparatus; receiving user input to the first mobile application store to select a mobile application to run on the apparatus; connecting to a second mobile application store (e.g. Google play store, Apple store etc.) operable only in an environment of an operating system (e.g. Android or iPhone) of a mobile device; accessing a user account database to retrieve user account information for authentication to connect to the second mobile application store; requesting for the mobile application to be downloaded to the apparatus from the second mobile application store; downloading the mobile application to the apparatus; installing the mobile application after the mobile application is downloaded; and instructing an emulator (e.g. 108 in FIG. 1) installed on the apparatus to run the mobile application on the apparatus when the mobile application is installed, wherein the emulator is for emulating the environment of the operating system of the mobile device in the environment of the operating system of the apparatus, wherein the mobile application selected to run is configured to run only in the environment of the operating system of the mobile device.

Wherein upon receiving the user input to the first mobile application store to select the mobile application to run on the apparatus, an executable file may be executed to initiate a process to connect to the second mobile application store, wherein the executable file is named with a title of the mobile application, an identifier of the mobile application, and a source identifier for identifying a location to obtain software for running the mobile application in the environment of the operating system of the apparatus.

The operating system of the apparatus may be an operating system of a personal computer.

The first mobile application store may be a web application accessible through a web browser (e.g. the example of FIG. 3).

The first mobile application store may be part of the emulator.

The method may further comprise: prior to displaying the first mobile application store, receiving user input to register for or login to a user account for connecting to the second mobile application store; and storing the user account information in the user account database for new user account registration or when the login to the user account is performed for a first time on the apparatus.

The method as claimed in any one of claims 1 to 6, wherein the first mobile application store is configured to display one or more mobile applications not found in the second mobile application for user selection to run.

The method may further comprise:
receiving user input to the first mobile application store to display one of the items in the list as follows:
 a) details of a selected mobile application in the first mobile application store;
 b) a list of categories pertaining to genre of mobile applications;
 c) a mobile application list sorted by a specific category;
 d) a mobile application list sorted by keyword query; and
 e) recommended mobile application or a list thereof;
connecting to the second mobile application store operable only in an environment of an operating system of a mobile device; accessing the user account database to retrieve user account information for authentication to connect to the second mobile application store; requesting for one of the above-listed items from the second mobile application store; and receiving the item for display.

The method may further comprise: configuring the first application store to be displayed with a user-selected theme.

An apparatus (e.g. 102 of FIG. 1 and 990 of FIGS. 9B and 9C) for operating a mobile application store, the apparatus comprises: a memory; and a processor configured to execute instructions in the memory to operate the apparatus to: execute a first mobile application store (e.g, the customized play store application described with reference to FIGS. 3, 4, and 9A to 9C) that operates in an environment of an operating system of an apparatus; receive user input to the first mobile application store to select a mobile application to run on the apparatus; connect to a second mobile application store (e.g. Google play store, Apple store etc.) operable only in an environment of an operating system of a mobile device (e.g. Android or iPhone); access a user account database to retrieve user account information for authentication to connect to the second mobile application store; request for the mobile application to be downloaded to the apparatus from the second mobile application store; download the mobile application to the apparatus; install the mobile application after the mobile application is downloaded; and instruct an emulator (e.g. 108 in FIG. 1) installed on the apparatus to run the mobile application on the apparatus when the mobile application is installed, wherein the emulator is for emulating the environment of the operating system of the mobile device in the environment of the operating system of the apparatus, wherein the mobile application selected to run is configured to run only in the environment of the operating system of the mobile device.

Upon receipt of the user input to the first mobile application store to select the mobile application to run on the apparatus, an executable file may be executed to initiate a process to connect to the second mobile application store, wherein the executable file is named with a title of the mobile application, an identifier of the mobile application, and a source identifier for identifying a location to obtain software for running the mobile application in the environment of the operating system of the apparatus.

The operating system of the apparatus may be an operating system of a personal computer.

The first mobile application store may be displayed in a web browser (e.g. the example of FIG. 3).

The first mobile application store may be part of the emulator.

The apparatus may be operable to: prior to displaying the first mobile application store, receive user input to register for or login to a user account for connecting to the second mobile application store; and store the user account information in the user account database for new user account registration or when the login to the user account is performed for a first time on the apparatus.

The first mobile application store may be configured to display one or more mobile applications not found in the second mobile application for user selection to run.

The apparatus may be operable to: receive user input to the first mobile application store to display one of the items in the list as follows:
a) details of a selected mobile application in the first mobile application store;
b) a list of categories pertaining to genre of mobile applications;
c) a mobile application list sorted by a specific category;
d) a mobile application list sorted by keyword query; and
e) recommended mobile application or a list thereof;
connect to the second mobile application store operable only in an environment of an operating system of a mobile device; access the user account database to retrieve user account information for authentication to connect to the second mobile application store; request for one of the above-listed items from the second mobile application store; and receive the item for display.

The apparatus may be operable to: configure the first application store to be displayed with a user-selected theme.

In the specification and claims, unless the context clearly indicates otherwise, the term "comprising" has the non-exclusive meaning of the word, in the sense of "including at least" rather than the exclusive meaning in the sense of "consisting only of". The same applies with corresponding grammatical changes to other forms of the word such as "comprise", "comprises" and so on.

While the invention has been described in the present disclosure in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

The invention claimed is:

1. A method for operating a mobile application store, the method comprising:
executing a first mobile application store that operates in an environment of an operating system of an apparatus;
receiving user input to the first mobile application store to select a mobile application to run on the apparatus;
connecting to a second mobile application store operable only in an environment of an operating system of a mobile device;
accessing a user account database to retrieve user account information for authentication to connect to the second mobile application store;
requesting for the mobile application to be downloaded to the apparatus from the second mobile application store;
downloading the mobile application to the apparatus;
installing the mobile application after the mobile application is downloaded;
instructing an emulator installed on the apparatus to run the mobile application on the apparatus when the mobile application is installed,
receiving user input to register for or login to a user account for connecting to the second mobile application store; and
storing the user account information in the user account database for new user account registration or when the login to the user account is performed for a first time on the apparatus,
wherein the emulator is for emulating the environment of the operating system of the mobile device in the environment of the operating system of the apparatus,
wherein the mobile application selected to run is configured to run only in the environment of the operating system of the mobile device, and
wherein the mobile application is selected from a plurality of mobile applications provided by the first mobile application store.

2. The method of claim 1, wherein upon receiving the user input to the first mobile application store to select the mobile application to run on the apparatus, an executable file is executed to initiate a process to connect to the second mobile application store, wherein the executable file is named with a title of the mobile application, an identifier of the mobile application, and a source identifier for identifying a location to obtain software for running the mobile application in the environment of the operating system of the apparatus.

3. The method of claim 1, wherein the operating system of the apparatus is an operating system of a personal computer.

4. The method of claim 1, wherein the first mobile application store is a web application accessible through a web browser.

5. The method of claim 1, wherein the first mobile application store is part of the emulator.

6. The method of claim 1, wherein
receiving the user input to register for or login to the user account for connecting to the second mobile application store is performed prior to displaying the first mobile application store.

7. The method of claim 1, wherein the first mobile application store is configured to display one or more mobile applications not found in the second mobile application store for user selection to run.

8. The method of claim 1, wherein the method further comprises:
receiving user input to the first mobile application store to display one of the items in the list as follows:
a) details of a selected mobile application in the first mobile application store;
b) a list of categories pertaining to genre of mobile applications;
c) a mobile application list sorted by a specific category;
d) a mobile application list sorted by keyword query; and
e) recommended mobile application or a list thereof;
requesting for one of the above-listed items from the second mobile application store; and
receiving the item for display.

9. The method of claim 1, wherein the method further comprises:
configuring the first application store to be displayed with a user-selected theme.

10. An apparatus for operating a mobile application store, the apparatus comprising:
a memory; and
a processor configured to execute instructions in the memory to operate the apparatus to:
execute a first mobile application store that operates in an environment of an operating system of an apparatus;
receive user input to the first mobile application store to select a mobile application to run on the apparatus;

connect to a second mobile application store operable only in an environment of an operating system of a mobile device;

access a user account database to retrieve user account information for authentication to connect to the second mobile application store;

request for the mobile application to be downloaded to the apparatus from the second mobile application store apparatus;

download the mobile application to the apparatus;

install the mobile application after the mobile application is downloaded;

instruct an emulator installed on the apparatus to run the mobile application on the apparatus when the mobile application is installed, receive user input to register or login to a user account for connecting to the second mobile application store; and store the user account information in the user account database for new user account registration or when the login to the user account is performed for a first time on the apparatus, wherein the emulator is for emulating the environment of the operating system of the mobile device in the environment of the operating system of the apparatus, wherein the mobile application selected to run is configured to run only in the environment of the operating system of the mobile device, and wherein the mobile application is selected from a plurality of mobile applications provided by the first mobile application store.

11. The apparatus of claim 10, wherein upon receipt of the user input to the first mobile application store to select the mobile application to run on the apparatus, an executable file is executed to initiate a process to connect to the second mobile application store, wherein the executable file is named with a title of the mobile application, an identifier of the mobile application, and a source identifier for identifying a location to obtain software for running the mobile application in the environment of the operating system of the apparatus.

12. The apparatus of claim 10, wherein the operating system of the apparatus is an operating system of a personal computer.

13. The apparatus of claim 10, wherein the first mobile application store is displayed in a web browser.

14. The apparatus of claim 10, wherein the first mobile application store is part of the emulator.

15. The apparatus of claim 10, wherein the apparatus is operable to:
receive the user input to register for or login to the user account for connecting to the second mobile application store
prior to displaying the first mobile application store.

16. The apparatus of claim 10, wherein the first mobile application store is configured to display one or more mobile applications not found in the second mobile application store for user selection to run.

17. The apparatus of claim 10, wherein the apparatus is operable to:

receive user input to the first mobile application store to display one of the items in the list as follows:
a) details of a selected mobile application in the first mobile application store;
b) a list of categories pertaining to genre of mobile applications;
c) a mobile application list sorted by a specific category;
d) a mobile application list sorted by keyword query; and
e) recommended mobile application or a list thereof;
request for one of the above-listed items from the second mobile application store; and
receive the item for display.

18. The apparatus of claim 10, wherein the apparatus is operable to:
configure the first application store to be displayed with a user-selected theme.

19. A non-transitory computer readable storage medium embodying thereon a program of computer readable instructions which, when executed by one or more processors of an apparatus, cause the apparatus to carry out a method for operating a mobile application store, the method comprising:

executing a first mobile application store that operates in an environment of an operating system of an apparatus;

receiving user input to the first mobile application store to select a mobile application to run on the apparatus;

connecting to a second mobile application store operable only in an environment of an operating system of a mobile device;

accessing a user account database to retrieve user account information for authentication to connect to the second mobile application store;

requesting for the mobile application to be downloaded to the apparatus from the second mobile application store;

downloading the mobile application to the apparatus;

installing the mobile application after the mobile application is downloaded;

instructing an emulator installed on the apparatus to run the mobile application on the apparatus when the mobile application is installed;

receiving user input to register for or login to a user account for connecting to the second mobile application store; and storing the user account information in the user account database for new user account registration or when the login to the user account is performed for a first time on the apparatus, wherein the emulator is for emulating the environment of the operating system of the mobile device in the environment of the operating system of the apparatus, wherein the mobile application selected to run is configured to run only in the environment of the operating system of the mobile device, and wherein the mobile application is selected from a plurality of mobile applications provided by the first mobile application store.

* * * * *